United States Patent
Yang et al.

(10) Patent No.: US 12,327,420 B2
(45) Date of Patent: Jun. 10, 2025

(54) VERIFICATION OF THE AUTHENTICITY OF IMAGES USING A DECODING NEURAL NETWORK

(71) Applicant: Google LLC, Mountain View, CA (US)

(72) Inventors: Feng Yang, Sunnyvale, CA (US); Hui Fang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 309 days.

(21) Appl. No.: 17/789,323

(22) PCT Filed: Feb. 3, 2020

(86) PCT No.: PCT/US2020/016384
§ 371 (c)(1),
(2) Date: Jun. 27, 2022

(87) PCT Pub. No.: WO2021/158205
PCT Pub. Date: Aug. 12, 2021

(65) Prior Publication Data
US 2023/0061517 A1    Mar. 2, 2023

(51) Int. Cl.
*G06V 20/80* (2022.01)
*G06V 10/40* (2022.01)
(Continued)

(52) U.S. Cl.
CPC .............. *G06V 20/80* (2022.01); *G06V 10/40* (2022.01); *G06V 10/771* (2022.01);
(Continued)

(58) Field of Classification Search
CPC ...... G06V 20/80; G06V 10/40; G06V 10/771; G06V 10/774; G06V 10/82; G06V 20/95; G06V 10/764; G06F 18/24133
See application file for complete search history.

(56) References Cited

U.S. PATENT DOCUMENTS

2007/0253592 A1* 11/2007 Sun .................. H04L 9/3247
382/100
2008/0273861 A1    11/2008 Yang et al.
(Continued)

FOREIGN PATENT DOCUMENTS

JP   2010/081214   4/2010
JP   2019/091434   6/2019
(Continued)

OTHER PUBLICATIONS

Zhou, Peng, et al. "Two-stream neural networks for tampered face detection." 2017 IEEE conference on computer vision and pattern recognition workshops (CVPRW). IEEE, 2017. (Year: 2017).*
(Continued)

*Primary Examiner* — Sean M Conner
(74) *Attorney, Agent, or Firm* — DORITY & MANNING P.A.

(57) ABSTRACT

This document describes techniques and apparatuses for verifying the authenticity of images. In aspects, methods include receiving, by a decoder system (220), an image (210) to be verified; performing feature recognition on the received image to determine determined features (238) of the received image; generating a first output (236) defining values representing the determined features; decoding the received image, by a message decoding neural network (252), to extract a signature (254) embedded in the received image, the embedded signature representing recovered features (258) of the received image; generating a second output (256) defining values representing the recovered features; providing the first output and the second output to a manipulation detection neural network (272); and generating, by the manipulation detection neural network, an estimation of an authenticity of the received image utilizing at least the first output and the second output.

18 Claims, 8 Drawing Sheets

(51) Int. Cl.
*G06V 10/771* (2022.01)
*G06V 10/774* (2022.01)
*G06V 10/82* (2022.01)
*G06V 20/00* (2022.01)

(52) U.S. Cl.
CPC ............ *G06V 10/774* (2022.01); *G06V 10/82* (2022.01); *G06V 20/95* (2022.01)

(56) References Cited

U.S. PATENT DOCUMENTS

| | | | |
|---|---|---|---|
| 2012/0020415 | A1 | 1/2012 | Yang et al. |
| 2019/0087918 | A1 | 3/2019 | Lewis et al. |
| 2020/0327410 | A1* | 10/2020 | Fairhart .................... G06N 3/08 |
| 2021/0150312 | A1* | 5/2021 | Lwowski .............. G06V 10/809 |
| 2021/0209415 | A1* | 7/2021 | Nataraj .................. G06V 10/82 |

FOREIGN PATENT DOCUMENTS

| | | |
|---|---|---|
| JP | 2019/135986 | 8/2019 |
| WO | WO2005031643 | 4/2005 |
| WO | WO2017176273 | 10/2017 |
| WO | WO 2019/240281 | 12/2019 |

OTHER PUBLICATIONS

Hayes, Jamie, and George Danezis. "Generating Steganographic Images via Adversarial Training." arXiv preprint arXiv:1703.00371 (2017) (Year: 2017).*

Mazumdar, Aniruddha, et al. "Universal image manipulation detection using deep siamese convolutional neural network." arXiv preprint arXiv:1808.06323 (2018). (Year: 2018).*

International Search Report for Application No. PCT/US2020/016384, mailed on Oct. 29, 2020, 3 pages.

Oza et al., "Active Authentication using an Autoencoder regularized CNN-based One-Class Classifier", arxiv.org, arxiv:1903.01031v1, Mar. 4, 2019, 8 pages.

Rehman et al., "End-to-End Trained CNN Encoder-Decoder Networks For Image Steganography", Proceedings of the European Conference on Computer Vision (ECCV) Workshops, Nov. 20, 2018, 6 pages.

International Preliminary Report on Patentability for Application No. PCT/US2020/016384, mailed Aug. 18, 2022, 8 pages.

Chinese Search Report Corresponding to Application No. 2020800945616 on Oct. 31, 2024.

* cited by examiner

VERIFICATION OF THE AUTHENTICITY OF IMAGES USING A DECODING NEURAL NETWORK

PRIORITY CLAIM

This application claims priority under 35 U.S.C. § 371 to and the benefit of International Patent Application No. PCT/US2020/016384 filed on Feb. 3, 2020. Applicant claims priority to and the benefit of the application and incorporates the application herein by reference in its entirety.

FIELD

The present disclosure relates generally to the verification of the authenticity of images. More particularly, the present disclosure relates to utilizing one or more machine-learned models to determine whether an image is manipulated and/or includes falsified data.

BACKGROUND

Utilizing artificial neural networks and computing processes, an image can be fraudulently altered to contain information that was not present when the image was originally created, resulting in the creation of a manipulated or "fake" image. For example, a deep-learning fake ("deepfake") can be created through the use of artificial neural networks where a video of a person making a first statement is modified to appear that the person made a second, different statement. In another example, a "face-swapping" application can be utilized to swap a first person's face with a second person's face on a still image.

Various approaches to detecting fake images have been created. For example, an algorithm can be utilized to detect subtle inconsistencies (e.g., lighting patterns) in the image indicative of tampering. While such approaches have been created, the reliable detection of fake images has proved to be a challenging and difficult problem. New frameworks are needed for verifying the authenticity of images to address limitations in the current techniques.

SUMMARY

Techniques and apparatuses are described for verifying the authenticity of images. In particular, the techniques and apparatuses can include or otherwise leverage one or more machine-learned models to verify the authenticity of received images to detect the manipulation of an image. The verification is based on comparing detected image features to recovered image features to determine if an image is fake or manipulated. The comparison of detected features and recovered features can be used to identify characteristics indicative of an inauthentic image that may not be detectable by a human observer.

In some implementations, a feature extraction process is utilized to extract determined features from an input image and a message embedding process is utilized to embed a signature including the determined features in the input image to generate an output image. A feature-extraction process is utilized to extract an embedded signature, including features, from a received image and recovering features from the signature. An authenticity process is then utilized to verify the authenticity of the image, for example, by comparing determined features and recovered features.

Aspects described below include a method performed by a system that includes an encoder system and a decoder system. In the method, the system (e.g., the decoder system) receives an image to be verified. The system performs feature recognition on the received image to determine a plurality of determined features of the received image. The system generates a first output that defines values that represent the determined features of the received image. The system includes a message decoding neural network that decodes the received image to extract a signature embedded in the received image. The embedded signature represents recovered features of the received image. The system generates a second output that defines values representing the recovered features. The system provides the first output and the second output to a manipulation detection neural network. The manipulation detection neural network generates an estimation of the authenticity of the received image utilizing at least the first output and the second output.

Aspects described below also include a computing device having a processor and a computer-readable storage medium having stored thereon instructions that responsive to execution by the processor, cause the processor to execute procedures for verifying the authenticity of images. Aspects described below include methods of generating images and methods of verifying the authenticity of images. Optional features of one aspect, such as the method described above, may be combined with other aspects.

BRIEF DESCRIPTION OF THE DRAWINGS

Techniques and apparatuses for verifying the authenticity of images utilizing machine-learned models are described with reference to the following drawings. The same numbers are used throughout the drawings to reference like features and components.

DETAILED DESCRIPTION

Overview

As described above, the present disclosure is directed to techniques and apparatuses for verifying the authenticity of images. In particular, the systems and methods of the present disclosure can include or otherwise leverage one or more machine-learned models to verify the authenticity of an image.

As used herein, the phrase "image" includes, but is not limited to, still images, moving images (e.g., video), moving images associated with audio, moving images associated with text, and the like. As used herein, the phrase "video" means a series or time sequence of moving images, which may or may not also be associated with other types of information, such as audio or text. For example, a video may include a time sequence of moving images that includes a stream of audio information. As used herein, the phrase "fake image" means an image that is presented as an original image but is a manipulated copy of the original image or is a fake copy of the original image. As used herein, the phrase "image feature," includes, but is not limited to, image-independent matrices of measurements throughout an image, facial expressions, landmarks, face landmarks of a person in the image, landmarks, key points, user-provided features, edges, corners, blogs, ridges, motion, optical flow, raw pixels from the image, and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Figure 1:
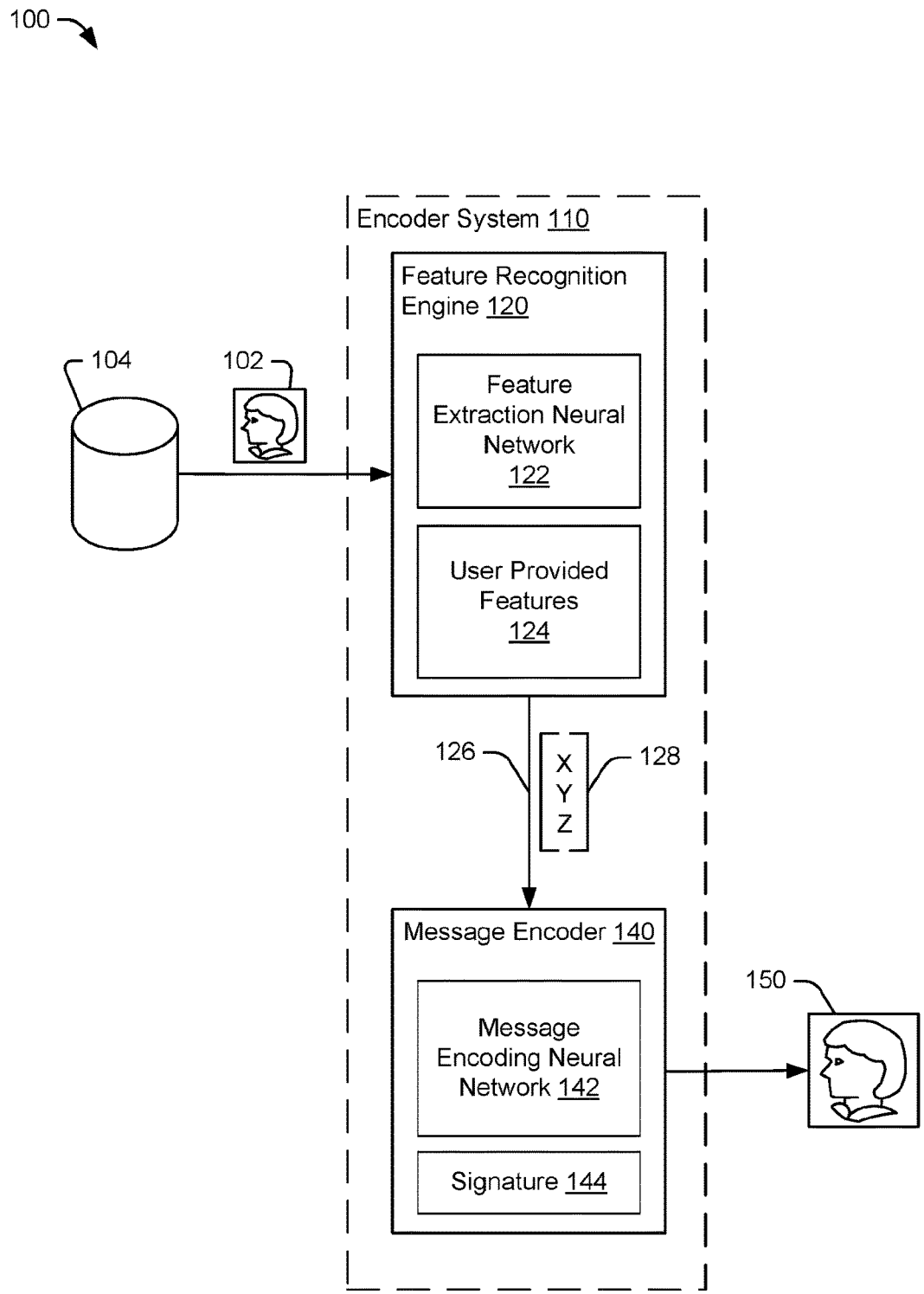
FIG. 1 illustrates an environment in which techniques and apparatuses for verifying the authenticity of images utilizing machine-learned models can be implemented.
Figure 2:
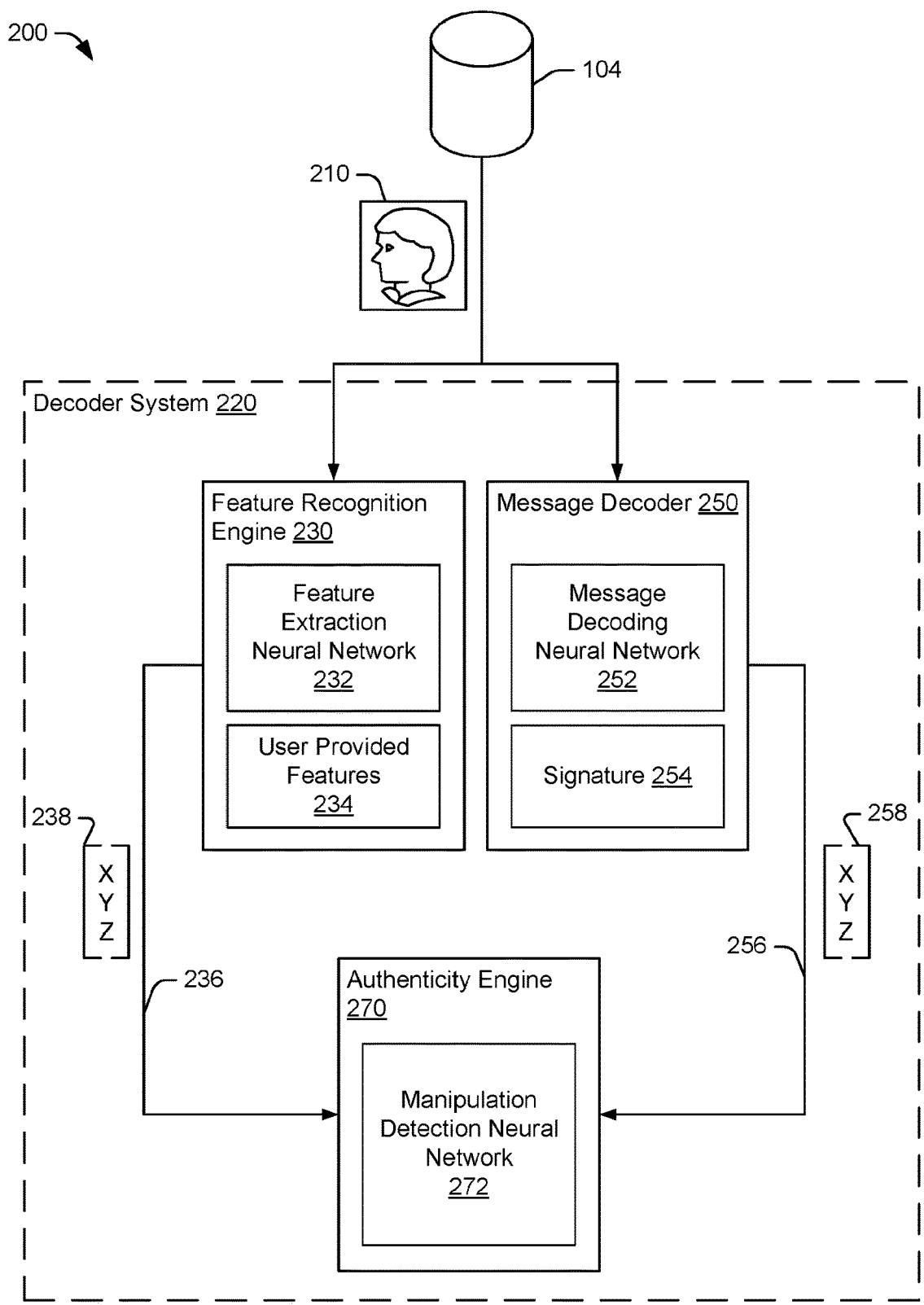
FIG. 2 illustrates another environment in which techniques and apparatuses for verifying the authenticity of images utilizing machine-learned models can be implemented.

FIG. 1 illustrates, an example system 100 that uses a feature recognition engine 120 (e.g., a feature extraction neural network 122) configured to extract image features from an input image 102 and a message encoder 140 (e.g., a message encoding neural network 142) configured to generate an output image 150 from the input image 102. FIG. 2 illustrates an example system 200 that uses a feature recognition engine 230 (e.g., a feature extraction neural network 232) configured to extract features 238 from a received image 210, a message decoder 250 (e.g., a message decoding neural network 252) configured to extract a signature 254 (hidden message) including features 258 from the received image 210, and/or an authenticity engine 270 (e.g., a manipulation detection neural network 272) configured to verify the authenticity of the received image 210 based on the processing of the received image 210. In aspects, the system may include one or both of an encoder system 110 of FIG. 1 configured to generate the output image and a decoder system 220 of FIG. 2 configured to decode a received image and to determine the authenticity of the received image. At least one of system 100, the components of system 100, system 200, or the components of system 200 may be implemented on one or more of a user computing device, an embedded computing device, a server computing device, a model processing device, a training device, a virtual computing device, other computing devices or computing infrastructure, or combinations thereof, for example as described below with respect to FIG. 3.

As illustrated in FIG. 1, in system 100, an input image 102 is received by the encoder system 110 as an input for processing. For example, a user may submit an image (e.g., a photograph) to the system 100 as the input image 102. In another example, a user may capture an input image 102 on an imaging device (e.g., a digital camera, a camera of a computing device) and the encoder system 110 is implemented in the image pipeline of the imaging device. In another example, the input image 102 may be stored in an image repository 104 and provided to the encoder system 110. The image repository 104 may be included in the system 100 (e.g., by one or more local wired or wireless connections) or may be remote to the system 100 and in communication with the system 100 over one or more wired or wireless connections (e.g., a local area network (LAN) or wide area network (WAN) connection). The image repository 104 may be, for example, a database stored locally at the system 100, a database hosted at a server remote to the system 100, or a memory device implemented on a computing device.

The system 100 (e.g., the encoder system 110) receives the input image 102, selects one or more features 128 of the input image 102, generates one or more signatures 144 based on the selected feature(s) 128, and embeds the signature(s) 144 into the input image 102 to create an output image 150. In aspects, the output image 150 may be stored on a memory device.

The system 100 (e.g., the encoder system 110) includes a feature recognition engine 120. The feature recognition engine 120 is configured to perform a feature extraction process on the input image 102 to determine a plurality of determined features 128 of the input image 102. For example, the feature recognition engine 120 may be configured to select a plurality of features from the input image 102 and processes the selected image features 128 to generate an output 126 (e.g., data) that defines values representing the determined features of the input image. In aspects, the feature recognition engine 120 selects a plurality of features from the input image 102 and processes the selected image features 128 to generate an output 126 that each represents a selected feature 128 of the input image 102. For example, the features 128 of the input image 102 could include an image-independent matrix of measurements, facial expressions, face landmarks of a person in the image, landmarks, key points, user-provided features, edges, corners, blogs, ridges, motion, optical flow, raw pixels from the image, and the like.

The feature recognition engine 120 can include a feature extraction neural network 122. The feature extraction neural network 122 can be configured to receive the input image 102 and process the input image 102 to generate the output 126 that defines values that represent a selected feature 128 of the input image 102. In aspects, the values each represent a selected feature 128 of the input image 102. For example, the feature extraction neural network 122 can receive an input image 102 and process the input image 102, or a portion thereof, to generate an output 126 that defines values that represent one or more image features that correspond to facial expressions, landmarks, key points, edges, corners, blogs, ridges, or the like. In aspects, output 126 defines values that each represent one or more image features that correspond to facial expressions, landmarks, key points, edges, corners, blogs, ridges, or the like. In other implementations, the feature recognition engine 120 may generate image features through the use of other feature extraction techniques and algorithms that do not rely on neural networks, such as principal component analysis, edge detection, Hough transforms, or other algorithms.

The feature recognition engine 120 can receive one or more user-provided features 124 provided by one or more user input components configured to receive input (selected image features) from a user. The user-provided features 124 may include, facial expressions, face landmarks of the person in the image, raw pixels from the image, and the like. The feature recognition engine 120 can include a feature extraction neural network 122 and user-provided features 124.

The system 100 (e.g., the encoder system 110) also performs a message embedding process on the input image 102. The system 100 sends an output 126 that specifies the image features 128 derived from the input image 102 to a message encoder 140. The message encoder 140 may include a message encoding neural network 142. The message encoding neural network 142 may be configured as a message coding neural network (e.g., a message encoding/decoding neural network) utilized to encode and decode messages. The message encoding neural network 142 of FIG. 1 and the message decoding neural network 252 of FIG. 2 are a message encoding/decoding neural network.

The message encoder 140 (e.g., message encoding neural network 142), receives the output 126 that specifies the image features 128 derived from the input image 102 from the system 100 and generates a signature 144 represents image features 128 of the input image 102 (e.g., includes the output 126). The message encoder 140 (e.g., message encoding neural network 142) processes the input image 102 by embedding the signature 144 (message) into the input image 102 as a digital message (e.g., a Steganographic signal) to generate an output image 150. In aspects, the signature 144 is a perceptually invisible watermark.

Weights may be shared between the feature recognition engine 120 (e.g., first feature extraction neural network 122, user-provided features 124) illustrated in FIG. 1 and the second feature recognition engine 230 (e.g., second feature extraction neural network 232, user-provided features 234) illustrated in FIG. 2.

FIG. 2 illustrates a system 200 that includes a decoder system 220 configured to decode a received image 210 and to verify the authenticity of the received image 210. The received image 210 is an image to be verified. In aspects, the received image 210 is a copy of the output image 150. In aspects, the received image 210 is a fake copy of input image 102 or output image 150. In aspects, the received image 210 is a manipulated copy of input image 102 or output image 150. The decoder system 220 determines the authenticity of the received image 210, for example, whether the received image 210 is the output image 150, or whether the received image 210 is a fake version of input image 102.

The system 100 can send the output image 150 generated by the encoder system 110 to the decoder system 220 as the received image 210. In some implementations, the received image 210 is provided to the decoder system 220 of the system 200; for example, a user may submit a photograph to the system 200 as received image 210. In another example, the received image 210 may be provided to the decoder system 220 by an image repository, such as image repository 104 of FIG. 1.

In one example, a user utilizes system 100 and/or system 200 to verify the authenticity of an image. In another example, an online service provider utilizes system 100 and/or system 200 to verify the authenticity of an image. In another example, a third party utilizes system 100 and/or system 200 to verify the authenticity of an image.

The system 200 provides the received image 210 to the decoder system 220 as an input, and the decoder system 220 determines if the received image 210 is a reliable copy (e.g., authentic copy, unaltered copy) or if the received image 210 is an unreliable copy, for example, a fake image or an altered copy of the output image 150 or input image 102. As illustrated in FIG. 2, the system 200 (e.g., decoder system 220) includes a feature recognition engine 230, a message decoder 250, and an authenticity engine 270.

The system 200 can provide the received image 210 as an input to the feature recognition engine 230. The feature recognition engine 230 is configured to perform a feature extraction process (feature recognition) on the received image 210 to determine a plurality of determined features 238 of the received image 210. For example, the determined features 238 of the received image 210 could include an image-independent matrix of measurements, facial expressions, landmarks, key points, user-provided features, edges, corners, blogs, ridges, motion, optical flow, pixels, and the like.

The feature recognition engine 230 selects a plurality of determined features 238 from the received image 210 and processes the determined features 238 to generate an output 236 (data) that defines values representing the determined features of the received image 210. In aspects, the feature recognition engine 230 selects a plurality of determined features 238 from the received image 210 and processes the determined features 238 to generate an output 236 (data) that defines values representing the determined features of the received image that each represents a selected feature of the received image 210. The output 236 of determined features 238 is sent by the system 200 to the authenticity engine 270.

The feature recognition engine 230 can include a second feature extraction neural network 232. The feature extraction neural network 232 performs the feature extraction process on the received image 210. The feature extraction neural network 232 can be configured to receive the received image 210 and process the received image 210 to generate the output 236 (data) that defines values representing the determined features 238 of the received image 210. For example, the feature extraction neural network 232 can be configured to receive the received image 210 and process the received image 210 to generate the output 236 that defines values that each represent a determined feature 238 of the received image 210. In some implementations, the feature extraction neural network 232 is the same neural network as the feature extraction neural network 122 of FIG. 1. In some implementations, the feature extraction neural network 232 is a different feature extraction neural network than the feature extraction neural network 122 of FIG. 1.

The feature recognition engine 230 can receive input including one or more user-provided features 234 provided by one or more user input components (e.g., user input component 322 of FIG. 3) configured to receive input (selected image features) from a user. The user-provided features 234 may include, for example, facial expressions, face landmarks of the person in the image, raw pixels from the image, and the like. In some implementations, the feature recognition engine 230 can include the second feature extraction neural network 232 and user-provided features 234.

The received image 210 can be provided as an input to the message decoder 250 of the decoder system 220. The message decoder 250 (e.g., a message decoding neural network 252) decodes the received image 210. For example, the message decoder 250 decodes the received image 210 by performing a message extraction process on the received image 210. In the message extraction process, the message decoder 250 processes the received image 210 to extract a signature 254 embedded in the received image 210. The signature 254 represents recovered features 258 that were embedded into the received image 210 by a message encoder (e.g., the message encoder 140 of FIG. 1). In aspects, the system 200 detects whether a signature is present in the received image 210.

The message extraction process includes the generation of a second output 256 (data) that defines values that represent recovered features 258 of the received image 210. In aspects, the message extraction process includes the generation of a second output 256 that defines values that each represent a recovered feature 258 of the received image 210 that were recovered from the signature 254. The output 256 of recovered features 258 is sent by the system 200 to the authenticity engine 270.

The output 236 (first output) from the feature recognition engine 230 and the output 256 (second output) of the message decoder 250 are provided to and are utilized by the authenticity engine 270 to generate a prediction (e.g., an estimate) of the authenticity of the received image 210. For example, the authenticity engine 270 of the decoder system 220 determines whether the received image 210 is a reliable copy (e.g., authentic copy, unaltered copy) or if the received image 210 is an unreliable copy, for example, a fake image or an altered copy.

The authenticity engine 270 can include a manipulation detection neural network 272 that receives the outputs (e.g., output 236, output 256). The manipulation detection neural network 272 uses at least output 236 and output 256 to generate an estimate (prediction) of the authenticity of the received image 210, for example, by comparing the output 236 to the output 256. Based on the estimate generated by the authenticity engine 270, the system 100 determines whether the received image 210 is a reliable copy (e.g., authentic copy, unaltered copy) or if the received image 210 is an unreliable copy, for example, a fake image or an altered copy.

Example Embodiments

Figure 3:
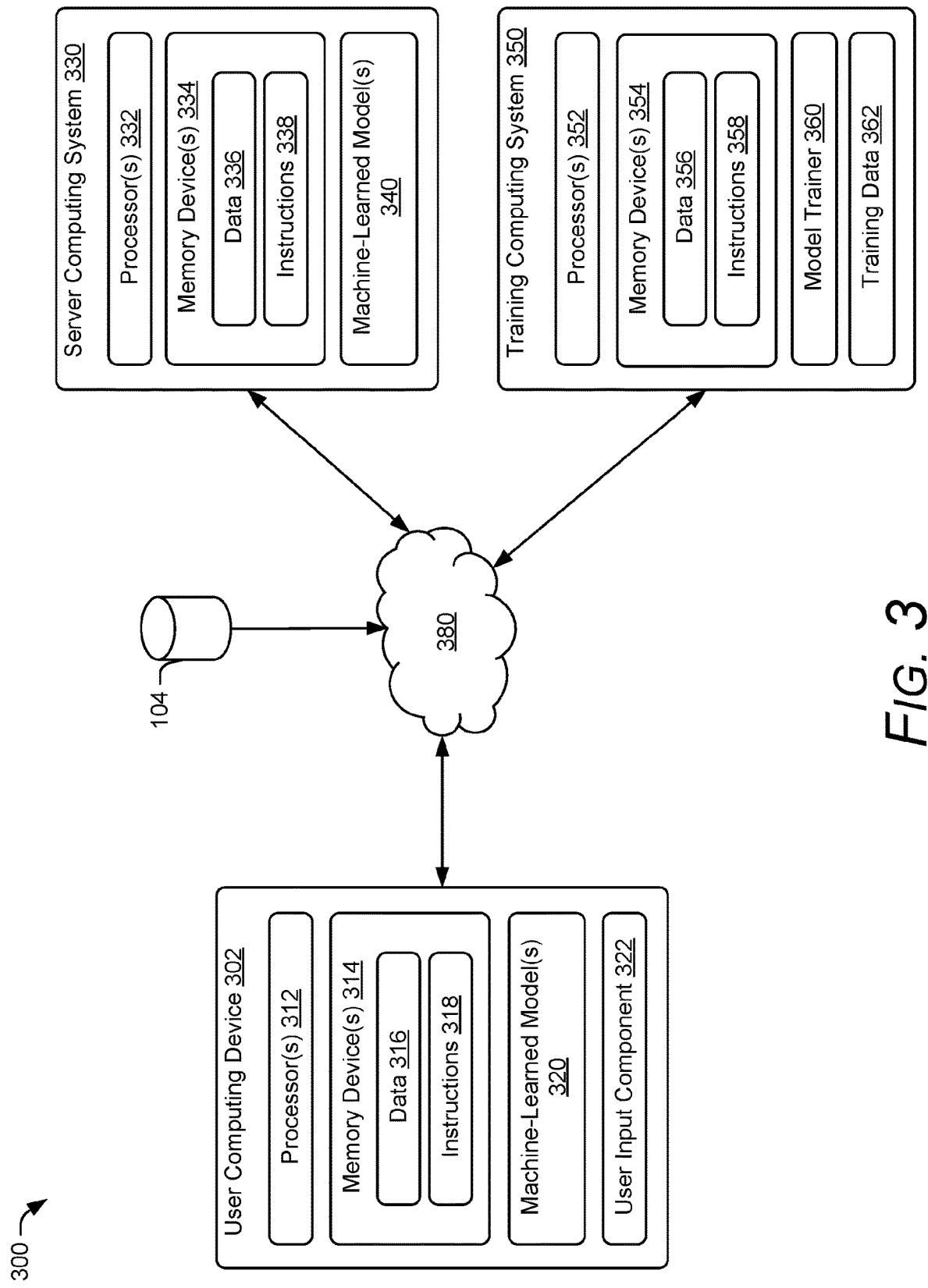
FIG. 3 depicts a block diagram of an example user computing system, an example server computing system, and an example training computing system, in accordance with some implementations of the present disclosure.

The systems and methods of the present disclosure can be implemented by or otherwise executed on one or more computing systems. Example computing systems in the computing system 300 include one or more of a user computing devices (e.g., laptops, desktops, mobile computing devices such as tablets, smartphones, wearable computing devices, cameras, etc.); embedded computing devices (e.g., devices embedded within a vehicle, camera, image sensor, industrial machine, satellite, gaming console or controller, or home appliance such as a refrigerator, thermostat, energy meter, home energy manager, smart home assistant, etc.); server computing devices (e.g., database servers, parameter servers, file servers, mail servers, print servers, web servers, game servers, application servers, etc.); dedicated, specialized model processing or training devices; virtual computing devices; other computing devices or computing infrastructure; or combinations thereof For example, FIG. 3 depicts a block diagram of an example computing system 300 that can verify the authenticity of images according to example embodiments of the present disclosure. The computing system 300 includes one or more of a user computing system 302, a server computing system 330, or a training computing system 350 that are communicatively coupled over a network 380.

The server computing system 330 can include or can otherwise be implemented by one or more server computing devices. In instances in which the server computing system 330 includes plural server computing devices, such server computing devices can operate according to sequential computing architectures, parallel computing architectures, or some combination thereof. In some implementations, the training computing system 350 includes or is otherwise implemented by one or more server computing devices.

The user computing system 302 includes one or more processors 312 and one or more memory devices 314. The server computing system 330 includes one or more processor(s) 332 and a memory device(s) 334. The training computing system 350 includes one or more processor(s) 352 and a memory device(s) 354. The processor(s) 312, 332, 352 can be any suitable processing device (e.g., a central processing unit (CPU); a visual processing unit (VPU); a graphics processing unit (GPU); a tensor processing unit (TPU); a neural processing unit (NPU); a neural processing engine; a core of a CPU, VPU, GPU, TPU, NPU or other processing device; an application-specific integrated circuit (ASIC); a field-programmable gate array (FPGA); a co-processor; a controller; or combinations of the processing devices described above) and can be one processor or a plurality of processors that are operatively connected. Processor(s) 312, 332, 352 can be embedded within other hardware components such as, for example, an image sensor, accelerometer, and the like.

The memory device(s) 314, 334, 354 can include one or more non-transitory computer-readable storage mediums, such as RAM, ROM, EEPROM, EPROM, flash memory devices, magnetic disks, and the like, and combinations thereof. The memory device(s) 314 can store data 316 and instructions 318, which are executed by the processor(s) 312 to cause the user computing system 302 to perform operations. The memory device(s) 334 can store data 336 and instructions 338, which are executed by the processor(s) 332 to cause the server computing system 330 to perform operations. The memory device(s) 354 can store data 356 and instructions 358, which are executed by the processor(s) 352 to cause the training computing system 350 to perform operations.

One or more of the user computing system 302, the server computing system 330, or the training computing system 350 can include an encoder system (e.g., encoder system 110 of FIG. 1). An example encoder system may include a feature recognition engine (e.g., feature recognition engine 120 of FIG. 1) and a message encoder (e.g., message encoder 140 of FIG. 1). In some implementations, one or more of the user computing system 302, the server computing system 330, or the training computing system 350 can include a decoder system (e.g., decoder system 220 of FIG. 2). An example decoder system may include at least one of a feature recognition engine (e.g., feature recognition engine 230 of FIG. 2), a message decoder (e.g., message decoder 250 of FIG. 2), or an authenticity engine (e.g., authenticity engine 270 of FIG. 2).

The user computing system 302 can store or include one or more machine-learned models 320. For example, the machine-learned models 320 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, or other forms of neural networks. More particularly, the machine-learned models 320 can include one or more of a feature extraction network (such as the feature extraction neural network 122 of FIG. 1 and/or the second feature extraction neural network 232 of FIG. 2), a message encoding neural network (such as the message encoding neural network 142 of FIG. 1), a message decoding neural network (such as the message decoding neural network 252 of FIG. 2), or a manipulation detection neural network (such as the manipulation detection neural network 272 of FIG. 2).

Additionally or alternatively, one or more machine-learned models 340 can be included in or otherwise stored and implemented by the server computing system 330 that communicates with the user computing system 302 according to a client-server relationship. For example, the machine-learned models 340 can be implemented by the server computing system 340 as a portion of a web service (e.g., an extreme multiclass or multilabel classification service, a language modeling service, a metric learning service). Thus, one or more models 320 can be stored and implemented at the user computing system 302 and/or one or more models 340 can be stored and implemented at the server computing system 330. In implementations, the machine-learned models 340 can include one or more of a feature extraction network (such as the feature extraction neural network 122 of FIG. 1 and/or the feature extraction neural network 232 of FIG. 2), a message encoding neural network (such as the message encoding neural network 142 of FIG. 1), a message decoding neural network (such as the message decoding neural network 252 of FIG. 2), or a manipulation detection neural network (such as the manipulation detection neural network 272 of FIG. 2).

The user computing system 302 can also include one or more user input component 322 that receives user input. For example, the user input component 322 can be a touch-sensitive component (e.g., a touch-sensitive display screen, a touchpad) that is sensitive to the touch of a user input object (e.g., a finger, a stylus). The touch-sensitive component can serve to implement a virtual keyboard. Other example user input components include a microphone, a traditional keyboard, or other means by which a user can provide user input.

As described above, the server computing system 330 can store or otherwise include one or more machine-learned models 340. For example, the models 340 can be or can otherwise include various machine-learned models. Example machine-learned models include neural networks or other multi-layer non-linear models. Examples of neural networks include feed-forward neural networks, deep neural networks, recurrent neural networks, and convolutional neural networks.

The computing system 300 may include an image repository 104. For example, the image repository 104 may be included in the system 300 by one or more local wired or wireless connections or may be remote to the system 300 and in communication with the system 300 over one or more wired or wireless connections, e.g., a local area network (LAN) or wide area network (WAN) connection. The image repository 104 may be, for example, a database stored locally at the user computing system 302 or a database hosted at a server remote to the system 300 (e.g., server computing system 330, training computing system 350).

The user computing system 302 and/or the server computing system 330 can train the models 320 and/or 340 via interaction with the training computing system 350 that is communicatively coupled over the network 380. The training computing system 350 can be separate from the server computing system 330 or can be a portion of the server computing system 330.

The training computing system 350 can include a model trainer 360 that trains the machine-learned models 320 and/or 340 stored at the user computing system 302 and/or the server computing system 330 using various training or learning techniques, such as, for example, verifying the authenticity of images based on comparing determined features and recovered features with the machine-learned models 320 and/or 340 and backward propagation of errors. In some implementations, performing backward propagation of errors can include performing truncated backpropagation through time. The model trainer 360 can perform a number of generalization techniques (e.g., weight decays, dropouts) to improve the generalization capability of the models being trained.

The model trainer 360 can train the machine-learned models 320 and/or 340 based on a set of training data 362. The training data 362 can include, for example, examples of the input data that have been assigned labels that correspond to the output data.

If the user has provided consent, the training examples can be provided by the user computing system 302. Thus, in such implementations, the model 320 provided to the user computing system 302 can be trained by the training computing system 350 on user-specific data received from the user computing system 302. In some instances, this process can be referred to as personalizing the model.

The model trainer 360 includes computer logic utilized to provide the desired functionality. The model trainer 360 can be implemented in hardware, firmware, and/or software controlling a general-purpose processor. For example, in some implementations, the model trainer 360 includes program files stored on a storage device, loaded into memory, and executed by one or more processors. In other implementations, the model trainer 360 includes one or more sets of computer-executable instructions that are stored in a tangible computer-readable storage medium such as RAM hard disk or optical or magnetic media.

The network 380 can be any type of communications network, such as a local area network (e.g., intranet), wide area network (e.g., Internet), or some combination thereof and can include any number of wired or wireless links. In general, communication over the network 380 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 3 illustrates one example of a computing system 300 that can be used to implement the present disclosure. Other computing systems can be used, as well. For example, in some implementations, the user computing system 302 can include the model trainer 360 and the training data 362. In such implementations, the models 320 can be both trained and used locally at the user computing system 302. In some such implementations, the user computing system 302 can implement the model trainer 360 to personalize the models 320 based on user-specific data.

Training

The frameworks described herein can be trained in many ways, for example, depending on how the feature extraction neural network, the message coding neural network (e.g., message encoding neural network, message decoding neural network, message encoding/decoding neural network), and/or the manipulation detection neural network are trained. In some implementations, one or more of the neural networks can be trained separately. In some implementations, one or more of the neural networks are co-trained. In other implementations, all of the neural networks are trained together.

Figure 4:
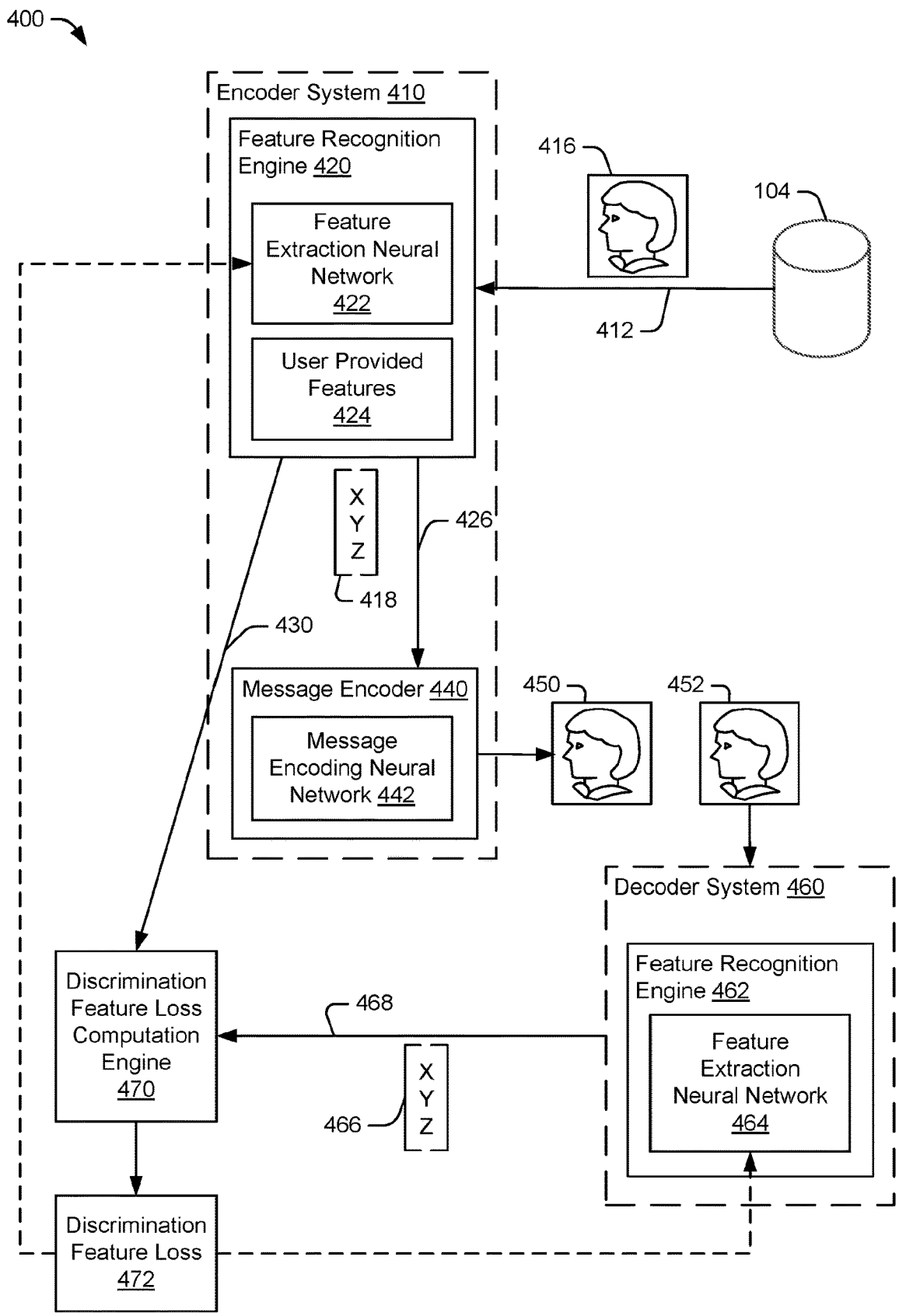
FIG. 4 illustrates an example system for training a feature extraction neural network to extract features from an image.

FIG. 4 depicts an example system 400 configured to train a first feature extraction neural network 422 (such as the first feature extraction neural network 122 of FIG. 1 and/or the second feature extraction neural network 232 of FIG. 2) to extract features from an image (e.g., input image 416) with improved accuracy. In aspects, the feature extraction neural network 422 is utilized in a system configured to verify the authenticity of an image (e.g., system 100 of FIG. 1, system 200 of FIG. 2).

The feature extraction neural network 422 may be trained separately from one or more of a message encoding neural network, a message decoding neural network, or a manipulation detection neural network. For example, at operation 412, an input image 416 is provided to an encoder system 410, including a feature recognition engine 420, for processing. For example, a user may submit an image (e.g., a photograph) to the system 400 as the input image 416. In another example, the feature recognition engine 420 is a feature extraction neural network 422 and an image repository 104 (as described in regards to FIG. 2) provides the input image 416 to the feature recognition engine 420. In implementations, the feature recognition engine 462 may generate determined features 418 through the use of other feature extraction techniques and algorithms that do not rely on neural networks, such as principal component analysis, edge detection, Hough transforms, or other algorithms.

The feature recognition engine 420 (e.g., feature extraction neural network 422) is configured to estimate (determine) features of the input image 416 and to generate an output of determined features 418 (such as features 128 of FIG. 1). In aspects, the feature extraction neural network 422 estimates determined features 418 that have characteristics that can be recognized as learned features by image recognition. The learned features should be sensitive to the detection of fake images; for example, if the image was manipulated or is fake, the learned features will be quite different.

Optionally, or additionally, the determined features 418 can be extracted from the input image 416 through the use of user input, such as user-provided features 424 (e.g., user-provided features 124 described herein). In implementations, a second feature recognition engine 462 may generate recovered features 466 through the use of other feature extraction techniques and algorithms that do not rely on neural networks, such as principal component analysis, edge detection, Hough transforms, or other algorithms.

After determined features 418 are estimated, the feature recognition engine 420 sends an output 430 of the determined features 418 to a discrimination feature loss computation engine 470. The determined features 418 are provided to the discrimination feature loss computation engine 470 to enable the discrimination feature loss computation engine 470 to compute a feature loss 472 that is used to train the feature extraction neural network 422. This process may be repeated until the computed loss is equal to or below a predetermined threshold, or until other convergence criteria are met.

The feature recognition engine 420 can also send an output 426 with the determined features 418 to a message encoder 440, including a message encoding neural network 442 (e.g., message encoding neural network 142 of FIG. 1), to generate an output image 450. In aspects, one or more signature(s) are generated based on the determined feature(s) 428, and the signature(s) are embedded into the input image 416 as a digital message (e.g., a Steganographic signal) to generate the output image 450. In implementations, the feature recognition engine 420 may generate determined features 418 through the use of other feature extraction techniques and algorithms that do not rely on neural networks, such as principal component analysis, edge detection, Hough transforms, or other algorithms.

A feature extraction process is performed on an image (e.g., the input image 416, a received image 452) by a feature recognition engine, for example by a first feature recognition engine 420 (e.g., first feature extraction neural network 422 (such as the first feature extraction neural network 122 of FIG. 1)) and/or by a second feature recognition engine 462 (e.g., second feature extraction neural network 464 (such as the feature extraction neural network 232 of FIG. 2)). For example, as illustrated in FIG. 4, a decoder system 460 includes the second feature recognition engine 462 (e.g., feature extraction neural network 464). The second feature recognition engine 462 decodes the received image 452 to extract a signature from the received image 452 (for example, as described above with respect to FIG. 2). The signature represents recovered features 466 of the received image 452.

The feature recognition engine (e.g., second feature recognition engine 462) sends an output 468 with the recovered features 466 to the discrimination feature loss computation engine 470. The recovered features 466 are provided to enable the discrimination feature loss computation engine 470 to compute a feature loss 472 that can be used to train the feature extraction neural network 422.

The system may perform a message coding neural network training procedure in which the discrimination feature loss computation engine 470 applies a discrimination feature loss function to the recovered features 466 and the determined features 418 to determine an image feature loss 472 caused by the estimation performed by the feature extraction neural network 422. The discrimination feature loss functions compare the determined features 418 of the input image 416 (such as the selected features 128 of the input image 102 of FIG. 1) to the recovered features 466 of the received image 452 (such as the recovered features 258 of the received image 210 of FIG. 2). If the tested image (e.g., received image 210 of FIG. 2) is authentic (e.g., is not a fake copy of the output image 450, is not a manipulated copy of the output image 450), then the discrimination feature loss functions should be small. However, if the tested image (e.g., received image 452) is not authentic (e.g., is a fake copy of the output image 450, is a manipulated copy of the output image 450), then the discrimination feature loss functions should be large.

The discrimination feature loss computation engine 470 sends the feature loss 472 as an output to the feature recognition engine 420 for use in training the feature extraction neural network 422. The loss function determines deviations between the determined features 418 estimated by the feature recognition engine 420 and the recovered features 466 generated by the second feature recognition engine 462. In some implementations, the loss function may represent the deviations as a loss in the accuracy of recovered features 466 in the received image 452 as a result of the received image 452 is a fake image.

After the loss is calculated, the feature loss 472 is used to further optimize the feature extraction neural network 422. For example, the feature loss 472 may be used to perform parameter optimization for layers of the feature extraction neural network 422.

Such a training loop may be repeated for multiple images from the image repository 104 to iteratively optimize the feature extraction neural network 422. Parameter optimization enables the feature extraction neural network 422 to more accurately estimate the features depicted in images. Over time and with sufficient training through iterations of the training loop, the feature extraction neural network 422 may improve to minimize the loss function such that the recovered features 466 provided to the discrimination feature loss computation engine 470 by the second feature recognition engine 462 converge to the determined features 418 provided to the discrimination feature loss computation engine 470 by the first feature recognition engine 420. The process illustrated in FIG. 4 may be repeated until the feature loss is equal to or below a predetermined threshold, or until other convergence criteria are met.

Figure 5:
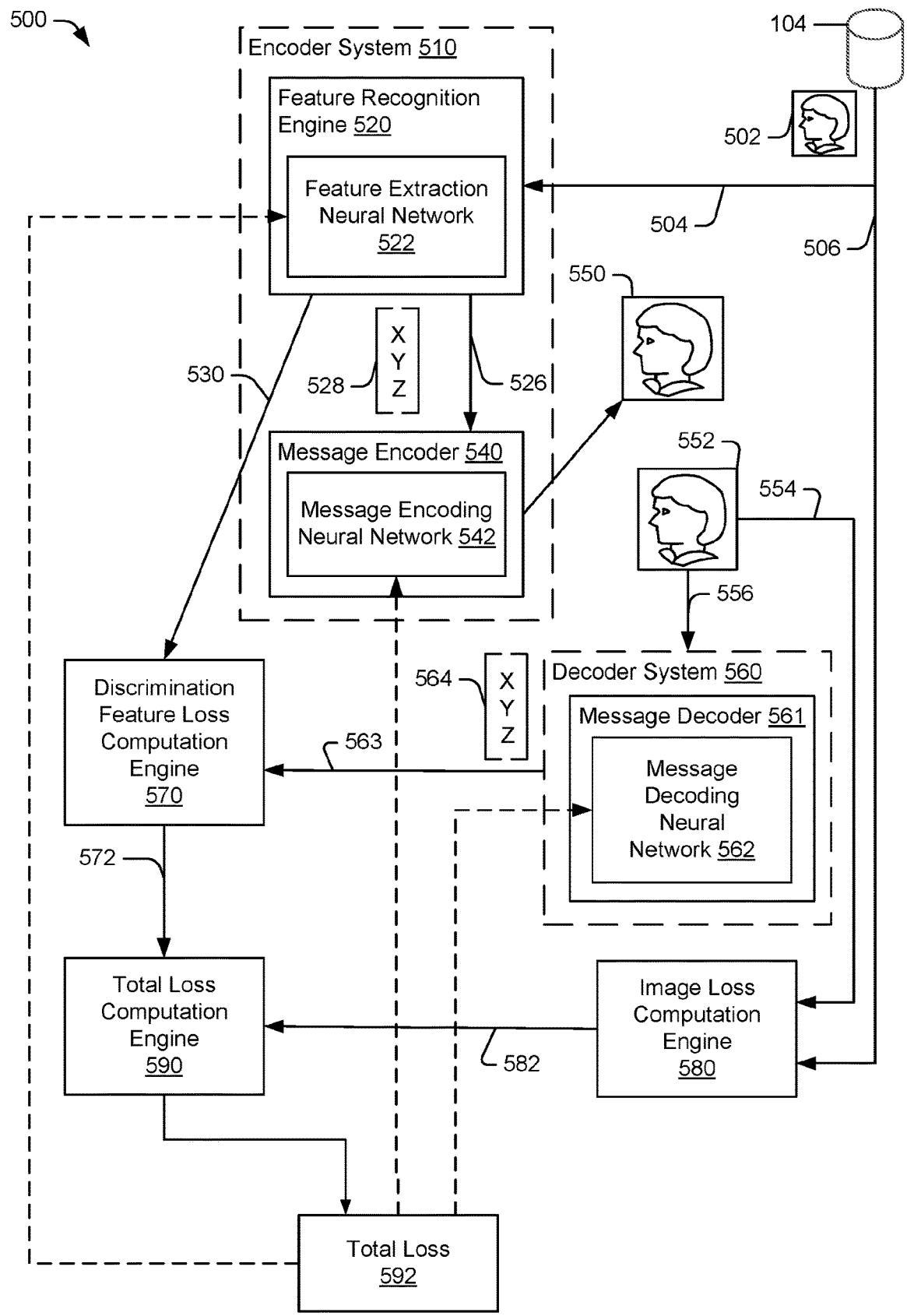
FIG. 5 illustrates an example system for training a message coding neural network to encode/decode images.

FIG. 5 depicts an example system 500 configured to train a message coding neural network (e.g., a message encoding/decoding neural network). For example, a message encoding neural network (e.g., message encoding neural network 542 of FIG. 5, message encoding neural network 142 of FIG. 1) of a message encoder 540 and/or a message decoding neural network (e.g., message decoding neural network 562 of FIG. 5, message decoding neural network 252 of FIG. 2) of a message decoder 561 of a decoder system 560 to encode output images and/or decode received images with improved accuracy. In aspects, at least one of the message coding neural network or the message decoding neural network is trained separately from a feature extraction neural network and/or a manipulation detection neural network. In aspects, the message coding neural extraction neural network is co-trained with one or more of a feature extraction neural network or a manipulation detection neural network.

At operation 504, an input image 502 is provided to a feature recognition engine 520 for processing. For example, as described above with respect to FIG. 4, a user may submit an image (e.g., a photograph) to the system 500 as the input image 502. In implementations, the input image 502 is modified in order to train at least one of the message encoding neural network 542 to be robust to such kinds of distortions. For example, the input image 502 can be modified (e.g., edited, resized, cropped) or can be a fake image.

In another example, the feature recognition engine 520 includes a first feature extraction neural network 522 of an encoder system 510. An image repository 104 (e.g., as described with respect to the image repository 104 of FIG. 4) provides the input image 502 to the feature recognition engine 520, as described with respect to FIG. 4. At operation 506, the input image 502 is also provided to an image loss computation engine 580 for processing.

The feature recognition engine 520 (e.g., feature extraction neural network 522) estimates (determines) features of the input image 502 and generates an output of determined features 528. In aspects, the feature extraction neural network 522 estimates determined features 528 that have characteristics that can be recognized as learned features by image recognition. The learned features should be sensitive to the detection of fake images; for example, if the image was manipulated or is fake, the learned features will be quite different. In aspects, user-provided features (such as user-provided features 124 of FIG. 1 and/or user-provided features 234 of FIG. 2) may be provided by a user for inclusion with the determined features 528.

Optionally, or additionally, the determined features 528 can be extracted from the input image 502 through the use of user-provided features, as is described above with respect to FIG. 4. In implementations, the feature recognition engine 520 may generate determined features 528 through the use of other feature extraction techniques and algorithms that do not rely on neural networks, such as principal component analysis, edge detection, Hough transforms, or other algorithms.

After estimated determined features 528, the feature recognition engine 520 sends an output 530 (third output) of the determined features 528 to a feature loss computation engine 570. The determined features 528 are provided to the feature loss computation engine 570 to enable the feature loss computation engine 570 to compute a feature loss 572 that is provided as an input to a total loss computation engine 590.

The feature recognition engine 520 also sends an output 526 with the determined features 528 to a message encoding neural network 542 (e.g., message encoding neural network 142 of FIG. 1) of a message encoder 540 to generate an output image 550. In aspects, one or more signature(s) are generated based on the determined feature(s) 528, and the signature(s) are embedded into the output image 550 as a digital message (e.g., a Steganographic signal) to generate the output image 550.

At operation 554, a received image 552 is sent to the image loss computation engine 580 for processing. At operation 556, a received image 552 is sent to the decoder system 560. In aspects, the decoder system 560 includes a message decoder 561. In aspects, the message decoder 561 includes a message decoding neural network 562. The message decoding neural network 562, such as the message decoding neural network 252 of FIG. 2, decodes the received image 552 to extract a signature from the received image 552. The signature represents recovered features 564 of the received image 552. In implementations, the message decoding neural network 252 is a message encoding/decoding neural network configured to both encode and decode images.

The message decoding neural network 562 is configured to send an output 563 (second output) that includes the recovered features 564 to the feature loss computation engine 570. The recovered features 564 are provided to the feature loss computation engine 570 to enable the feature loss computation engine 570 to compute a feature loss 572 that is provided as an input to a total loss computation engine 590.

The system 500 determines a feature loss 572. In implementations, the system 500 includes a feature loss computation engine 570 that applies a loss function to determine the feature loss 572. The loss function determines deviations between the determined features 528, which were estimated by the feature recognition engine 520 in relation to features in the input image 502, and the recovered features 564 extracted by the message decoding neural network 562 in relation to features in the received image 552. In some implementations, the loss function may represent the deviations as a loss in the accuracy of the recovered features 564 in the received image 552 as a result of the received image 552 is a fake image. After the loss is calculated, the feature loss 572 is sent as an output (first loss) to the total loss computation engine 590. The feature loss 572 is provided to the total loss computation engine 590 to further optimize one or more of the feature extraction neural network 522, the message encoding neural network 542, the message decoding neural network 562, or a message coding neural network (e.g., a message encoding/decoding neural network).

The system 500 determines an image loss 582. In implementations, the system 500 includes an image loss computation engine 580 that receives the input image 502 and the received image 552 and applies a loss function to determine an image loss 582. The loss function determines deviations between the input image 502 and the received image 552. In some implementations, the loss function may represent deviations in the received image 552 as a result of a fake image or a manipulated image. After the image loss 582 is calculated, the image loss 582 is sent to the total loss computation engine 590 and can be used to further optimize one or more of the feature extraction neural network 522, the message encoding neural network 542, or the message decoding neural network 562.

The system 500 determines a total loss 592 based on the image loss 582 and the feature loss 572. In aspects, the system 500 includes a total loss computation engine 590 that applies a loss function to the feature loss 572 and the image loss 582 to determine the total loss 592. The total loss 592 may be caused by the estimation performed by at least one of the first feature extraction neural network 522 or the message decoding neural network 562. The loss function determines deviations between the feature loss 572 computed by the feature loss computation engine 570 and the image loss 582 computed by the image loss computation engine 580.

The total loss function to be optimized can be represented by the following equation:

$$L = L_{il}(I_i, I_o) + L_{fl}(f, f_{ii}) \quad (1)$$

Where the total loss equals the image loss function (input image, output image) plus the feature loss function (features, recovered features from input image). In the equation, total loss is L, image loss function is $L_{il}$, feature loss function is $L_{fl}$, input image is $I_i$, output image is $I_o$, features are f, and recovered features from input image are $f_{ii}$.

After the total loss is calculated, the computed total loss 592 is used to further optimize at least one of the feature extraction neural network 522, the message decoding neural network 562, or a message coding neural network (e.g., a message encoding/decoding neural network). For example, the computed total loss 592 may be used to perform parameter optimization for layers of one or more of the feature extraction neural network 522 or the message decoding neural network 562. The process illustrated in FIG. 5 may be repeated until the computed total loss is equal to or below a predetermined threshold, or until other convergence criteria are met. Such a training loop may be repeated for multiple images from the image repository 104 to iteratively optimize one or more of the feature extraction neural network 522, the message encoding neural network 542, or the message decoding neural network 562. In implementations, parameter optimization enables the feature extraction neural network 522 to more accurately estimate the features depicted in images. Over time and with sufficient training through iterations of the training loop, the feature extraction neural network 522 may improve such that the recovered features 536 provided to the feature loss computation engine 570 by the message decoding neural network 562 converge to the determined features 528 provided to the feature loss computation engine 570 by the feature extraction neural network 522.

In implementations, a manipulation detection neural network (e.g., the manipulation detection neural network 272 illustrated in FIG. 2) is trained separately from one or more of a message encoding neural network (e.g., the message encoding neural network 142 of FIG. 1), a message decoding neural network (e.g., the message decoding neural network 252 of FIG. 2, the message decoding neural network 562 of FIG. 5), or a feature extraction neural network (e.g., the feature extraction neural network 122 of FIG. 1, the feature extraction neural network 232 of FIG. 2, the feature extraction neural network 422 of FIG. 4, the second feature extraction neural network 464 of FIG. 4, the first feature extraction neural network 522 of FIG. 5).

To train the manipulation detection neural network, the values of at least one of the feature extraction neural network, message encoding neural network, feature extraction neural network, or message decoding neural network is fixed, and a training image is generated. The training image may include at least one image manipulation. In aspects, the input image may be a training image. In aspects, the received image may be a training image.

The system sends the training image to the manipulation detection neural network. The manipulation detection neural network determines the image manipulation applied to the training image. Utilizing the image manipulation applied to the training image, the manipulation detection neural network computes a normal loss based on a normal loss function. In implementations, the normal loss is a cross-entropy loss. The manipulation detection neural network is trained based at least on the computed normal loss. In aspects, the loss function applied is a normal loss function for classification.

The feature extraction neural network can be co-trained with a message coding neural network (e.g., a message encoding/decoding neural network, one or more of a message encoding neural network or a message encoding/decoding neural network) to extract features from an image and/or to encode/decode messages in images with improved accuracy. For example, through the combination of the separate feature extraction neural network training, described above, with the separate message encoding/decoding neural network training, described above. The total loss function to be optimized can be represented by the following equation:

$$L = L_{il}(I_i, I_o) + L_{fl}(f, f_{ii}) + L_{dfl}(f, f_{ri}) \quad (2)$$

Where the total loss equals the image loss function (input image, output image) plus the feature loss function (features, recovered features from input image) plus the discrimination feature loss function (features, features from received image). In the equation, total loss is L, image loss function is $L_{il}$, feature loss function is $L_{fl}$, input image is $I_i$, output image is $I_o$, features are f, recovered features from the input image are $f_{ii}$, discrimination feature loss function is $L_{dfl}$, and features from the received image are $f_{ri}$.

The input image may be perceptually the same as output image, and the recovered features from the input image are as close as possible to the features extracted (recovered) from the input image, even if some image manipulation (or faking) is present. In this case, the feature learned might be features that are easier for the message encoding neural network to hide and extract. Further, the learned features may be sensitive to image manipulation (or faking), and as a result, if the image is changed (e.g., manipulated, faked), the features extracted will be quite different from that extracted from the input image. In such an aspect, the manipulation detection neural network may be trained separately, as described above.

The feature extraction neural network can be co-trained with the manipulation detection neural network to extract features from an image and/or to determine whether the received image is a fake or manipulated version of the input image with improved accuracy. In such an aspect, the message coding neural network (e.g., the message encoding neural network 142 of FIG. 1 and the message decoding neural network 252 of FIG. 2) may be trained first. To train the message coding neural network, image manipulation (or faking) that is desirable to detect could be applied to a random input image with random features.

The total loss function to be optimized could be represented by the following equation:

$$L = L_{il}(I_i, I_o) + L_{fl}(f_{ra}, f_{rr}) \quad (3)$$

Where the total loss equals the image loss function (input image, output image) plus the feature loss function (random features, recovered random features). In the equation, total loss is L, image loss function is $L_{il}$, feature loss function is $L_{fl}$, random features are $F_{ra}$, and recovered random features are $f_{rr}$.

The input image can be perceptually the same as output image, and random features are recovered from the input image. The weights in the message coding neural network are then fixed, and the feature extraction network and manipulation detection neural network are co-trained. An image manipulation or fake desired to be detected can then be randomly applied or not applied.

The total loss function to be optimized can be represented by the following equation:

$$L = L_{dfl}(f, f_{ri}) + L_{ce} \qquad (4)$$

Where the total loss equals the discrimination feature loss function (features, features from received image) plus cross-entropy loss (fake or real). In the equation, total loss is L, discrimination feature loss function is $L_{dfl}$, features from the received image are $f_{ri}$, and cross-entropy loss (fake or real) is $L_{ce}$. Through such a training process, the feature extraction neural network will learn the best features for detecting fake or real images.

A message coding neural network (e.g., the message encoding neural network 142 of FIG. 1 and the message decoding neural network 252 of FIG. 2) can be co-trained with a manipulation detection neural network to encode/decode messages in images and/or to determine whether a received image is a fake or manipulated version of an input image with improved accuracy. In such an aspect, the feature extraction neural network is separately trained, as described above. After the feature extraction neural network is trained, then the weights are fixed. To co-train the message coding neural network and manipulation detection neural network, an image manipulation or fake desired to be detected is randomly applied or not applied. The total loss function to be optimized can be represented by the following equation:

$$L = L_{il}(I_i, I_o) + L_{fl}(f, f_{ii}) + L_{ce} \qquad (5)$$

Where the total loss equals the image loss function (input image, output image) plus the feature loss function (features, recovered features from input image) plus cross-entropy loss (fake or real). In the equation, total loss is L, image loss function is $L_{il}$, feature loss function is $L_{fl}$, input image is $I_i$, output image is $I_o$, features are f, recovered features from the input image are $f_{ii}$, and cross-entropy loss (fake or real) is $L_{ce}$. In aspects, the input image can be perceptually the same as output image, and the recovered features from the input image are as close as possible to the features extracted (recovered) from the input image, even if some image manipulation (or faking) is present.

A feature extraction neural network can be co-trained with a message coding neural network (e.g., a message encoding/decoding neural network, a message encoding neural network and a message decoding neural network), and a manipulation detection neural network to extract features from an image with improved accuracy, to encode/decode messages in images, and/or to determine whether the received image is a fake or manipulated version of the input image with improved accuracy.

A manipulation or fake that is desired to be detected can be randomly applied or not applied. The total loss function to be optimized can be represented by the following equation:

$$L = L_{il}(I_i, I_o) + L_{fl}(f, f_{ii}) + L_{dfl}(f, f_{ri}) + L_{ce} \qquad (6)$$

Where the total loss equals the image loss function (input image, output image) plus the feature loss function (random features, recovered random features) plus discrimination feature loss function (features, features from received image) plus cross-entropy loss (fake or real). In the equation, total loss is L, image loss function is $L_{il}$, feature loss function is $L_{fl}$, random features are $F_{ra}$, recovered random features are $f_{rr}$, discrimination feature loss function is $L_{dfl}$, features from the received image are $f_{ri}$, and cross-entropy loss (fake or real) is $L_{ce}$.

In a case where the received image is a fake image, the discrimination feature loss functions will penalize the case features, and features from the received image are close. In a case where the received image is real, the discrimination feature loss functions will penalize the case features, and features from the received image are far. It is desirable for the input image to be perceptually the same as an output image. It is desirable for the message coding neural network to be robust to image manipulation or fake. It is desirable for the feature exacted to be sensitive for image manipulation or fake.

While features and concepts of the described techniques and apparatuses for verifying the authenticity of images can be implemented in any number of different environments, systems, devices, and/or various configurations, aspects of verifying the authenticity of images are described in the context of the following example devices, systems, and configurations.

For instances in which the techniques and/or apparatuses discussed herein may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about them and used.

Methods

Figure 6:
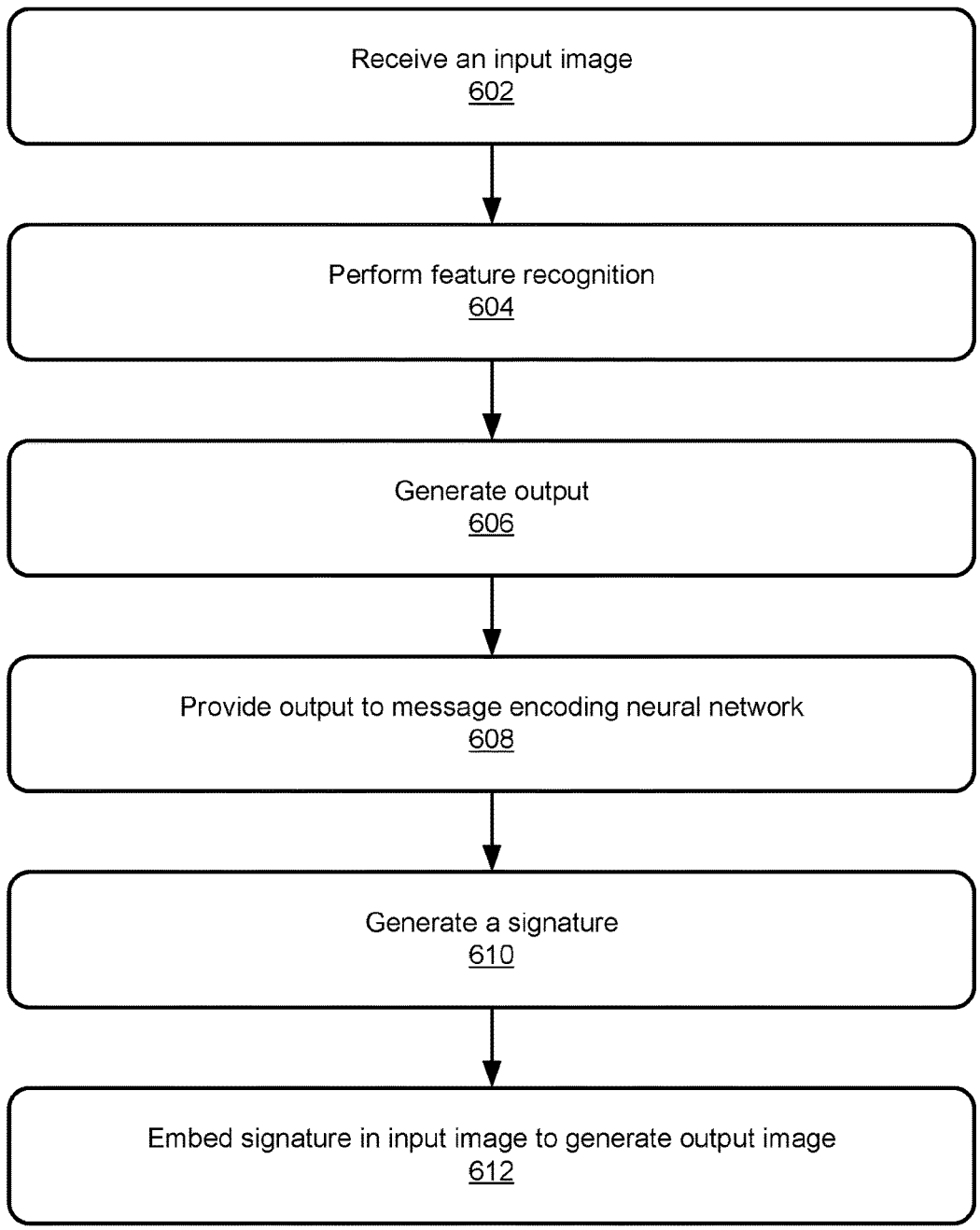
FIG. 6 illustrates a method of generating an image to be verified.

FIG. 6 illustrates an example method 600 of generating an image to be verified. The method 600 may be performed by a system 100 as described above with respect to FIG. 1, utilizing one or more of the components described with respect to FIG. 1. At 602, an encoder system receives an input image. The encoder system, at 604, performs a feature recognition on the input image to determine a plurality of determined features of the input image. At 606, the encoder system generates a third output defining values representing the determined features of the input image. At 608, the encoder system provides the third output to a message encoding neural network. At 610, the message encoding neural network generates a signature from the third output defining values representing the determined features of the input image. The encoder system, at 612, embeds the second signature in the input image to generate an output image. In aspects, method 600 includes verifying the authenticity of the image. The method 600 may be performed including additional or fewer operations than what is illustrated or in a different order.

In an example use case for method 600, a user of a user computing device utilizes a camera module of the user computing device to take an input image (photograph). An encoder system implemented on the user computing device receives the input image. The encoder system performs a feature recognition on the input image to determine a plurality of determined features of the input image. The encoder system generates an output defining values representing the determined features of the input image. The encoder system provides the output to a message encoding neural network implemented on a memory device of the user computing device. The message encoding neural network generates a signature from the output defining values representing the determined features of the input image. The encoder system embeds the signature in the input image to generate an output image that is stored on the memory device of the user computing device.

In another example use case for method 600, images are stored in an image repository. An encoder system implemented on a server computing device receives an input image from the image repository. For example, an image repository can be utilized by the operator of a server computing device to store images uploaded by users of a service provided by the operator. The encoder system performs a feature recognition on the input image to determine a plurality of determined features of the input image. The encoder system generates an output defining values representing the determined features of the input image. The encoder system provides the output to a message encoding neural network implemented on a memory device of the server computing device. The message encoding neural network generates a signature from the output defining values representing the determined features of the input image. The encoder system embeds the signature in the input image to generate an output image that is stored on the memory device of the server computing device. The embedded signature can be utilized to verify the image at a later time.

Figure 7:
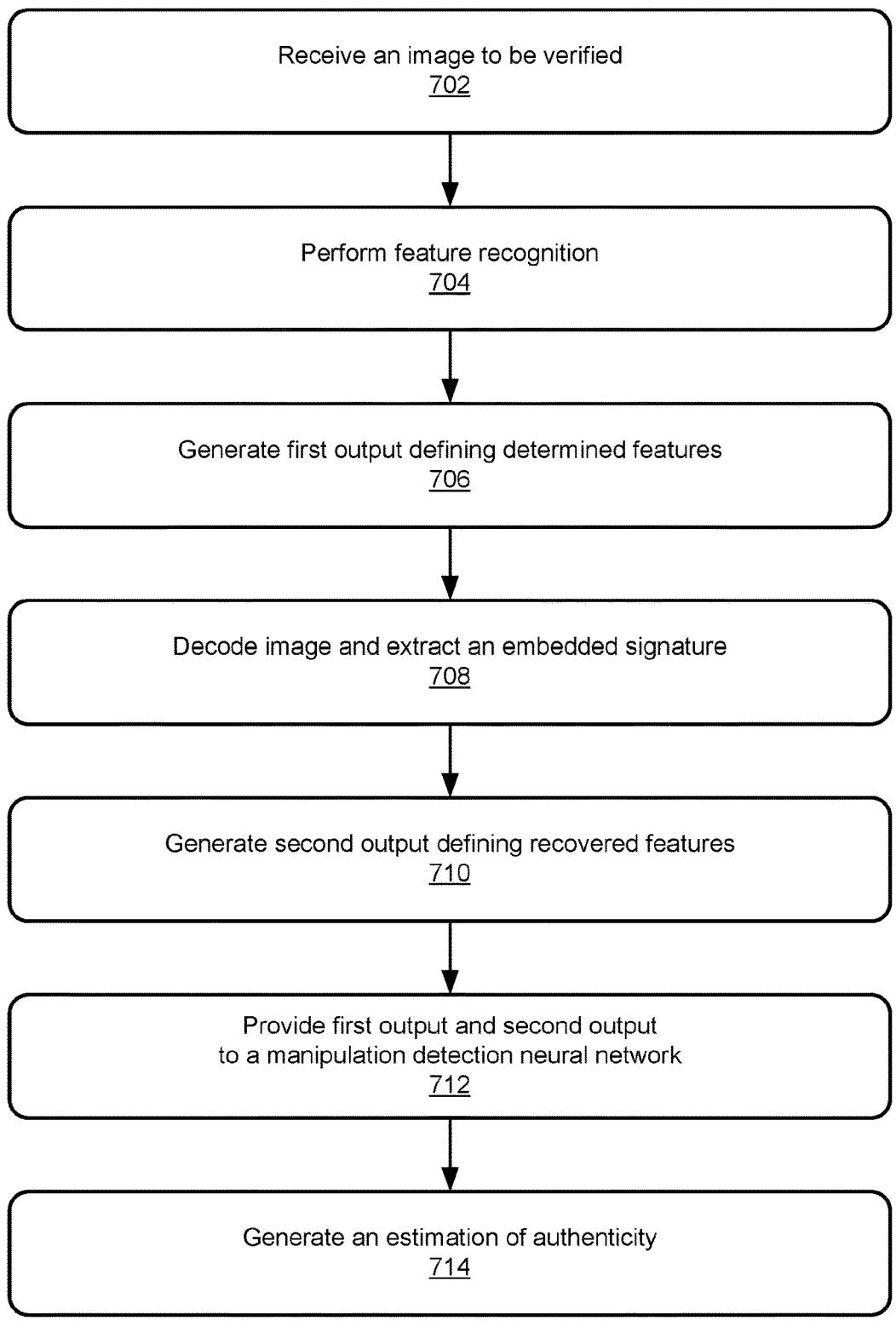
FIG. 7 illustrates a method of verifying the authenticity of an image.

FIG. 7 illustrates an example method 700 of verifying the authenticity of an image. The method 700 may be performed by a system 200 as described above with respect to FIG. 2, utilizing one or more of the components described with respect to FIG. 2. At 702, a decoder system receives an image to be verified. At 704, the decoder system performs feature recognition on the received image to determine a plurality of determined features of the received image. The decoder system, at 706, generates a first output defining values representing the determined features of the received image. At 708, the decoder system utilizes a message decoding neural network to decode the received image to extract a signature embedded in the received image. The embedded signature represents recovered features of the received image. The decoder system, at 710, generates a second output that defines values representing the recovered features of the received image. At 712, the decoder system provides the first output and the second output to a manipulation detection neural network. At 714, the manipulation detection neural network generates an estimation of an authenticity of the received image utilizing at least the first output and the second output. In aspects, method 700 includes verifying the authenticity of the image. The method 700 may be performed including additional or fewer operations than what is illustrated or in a different order.

In an example use case for method 700, a decoder system implemented on a user computing device receives an image to be verified from a memory device implemented on the user computing device. The decoder system performs feature recognition on the received image to determine a plurality of determined features of the received image. The decoder system generates a first output defining values representing the determined features of the received image. The decoder system utilizes a message decoding neural network implemented on the user computing device to decode the received image to extract a signature embedded in the received image. The embedded signature represents recovered features of the received image. The decoder system generates a second output that defines values representing the recovered features of the received image. The decoder system provides the first output and the second output to a manipulation detection neural network implemented on the user computing device. The manipulation detection neural network generates an estimation of an authenticity of the received image utilizing at least the first output and the second output.

In another example use case for method 700, a decoder system implemented on a server computing device receives an image to be verified from an image repository. For example, an image repository can be utilized by the operator of a server computing device to store images uploaded by users of a service provided by the operator. The decoder system performs feature recognition on the received image to determine a plurality of determined features of the received image. The decoder system generates a first output defining values representing the determined features of the received image. The decoder system utilizes a message decoding neural network implemented on the server computing device to decode the received image to extract a signature embedded in the received image. The embedded signature represents recovered features of the received image. The decoder system generates a second output that defines values representing the recovered features of the received image. The decoder system provides the first output and the second output to a manipulation detection neural network implemented on the server computing device. The manipulation detection neural network generates an estimation of an authenticity of the received image utilizing at least the first output and the second output.

Machine-Learned Models

Figure 8:
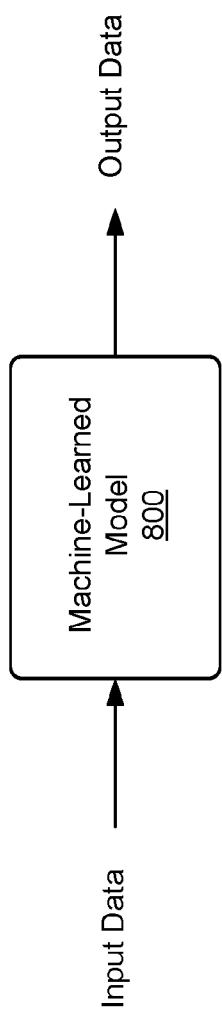
FIG. 8 illustrates a block diagram of an example machine-learned model according to example implementations of the present disclosure.

FIG. 8 depicts a block diagram of an example machine-learned model 800 according to example implementations of the present disclosure. As illustrated in FIG. 8, the machine-learned model 800 is trained to receive input data of one or more types and, in response, to provide output data of one or more types. Thus, FIG. 8 illustrates the machine-learned model 800 performing inference.

The input data can include one or more features that are associated with an instance or an example. In some implementations, the one or more features associated with the instance or example can be organized into a feature vector. In some implementations, the output data can include one or more predictions. Predictions can also be referred to as inferences. Thus, given features associated with a particular instance, the machine-learned model can output a prediction for such instance based on the features.

The machine-learned model can be or include one or more of various different types of machine-learned models. In particular, in some implementations, the machine-learned model can perform classification, regression, clustering, association, anomaly detection, recommendation generation, and/or other tasks.

The machine-learned model can perform various types of classification based on the input data. For example, the machine-learned model can perform binary classification or multiclass classification. In binary classification, the output data can include a classification of the input data into one of two different classes. In multiclass classification, the output data can include a classification of the input data into one (or more) of more than two classes. The classifications can be a single label or multi-label.

The machine-learned model can perform discrete categorical classification in which the input data is simply classified into one or more classes or categories.

The machine-learned model can perform classification in which the machine-learned model provides, for each of one or more classes, a numerical value descriptive of a degree to which it is believed that the input data should be classified into the corresponding class. In some instances, the numerical values provided by the machine-learned model can be referred to as "confidence scores" that are indicative of respective confidence associated with the classification of the input into the respective class. In some implementations, the confidence scores can be compared to one or more thresholds to render a discrete categorical prediction. In some implementations, only a certain number of classes (e.g., one) with the relatively largest confidence scores can be selected to render a discrete categorical prediction.

The machine-learned model can provide a probabilistic classification. For example, the machine-learned model can be able to predict, given a sample input, a probability distribution over a set of classes. Thus, rather than outputting only the most likely class to which the sample input should belong, the machine-learned model can output, for each class, a probability that the sample input belongs to such class. In some implementations, the probability distribution over all possible classes can sum to one. In some implementations, a softmax function or layer can be used to squash a set of real values respectively associated with the possible classes to a set of real values in the range (0, 1) that sum to one.

The probabilities provided by the probability distribution can be compared to one or more thresholds to render a discrete categorical prediction. In some implementations, only a certain number of classes (e.g., one) with the relatively largest predicted probability can be selected to render a discrete categorical prediction.

The machine-learned model can be trained using supervised learning techniques in implementations in which the machine-learned model performs classification. For example, the machine-learned model can be trained on a training dataset that includes training examples labeled as belonging (or not belonging) to one or more classes. Further details regarding supervised training techniques are provided below.

The machine-learned model can perform regression to provide output data in the form of a continuous numeric value. The continuous numeric value can correspond to any number of different metrics or numeric representations, including, for example, currency values, scores, or other numeric representations. As examples, the machine-learned model can perform linear regression, polynomial regression, or nonlinear regression. As examples, the machine-learned model can perform simple regression or multiple regression. As described above, in some implementations, a softmax function or layer can be used to squash a set of real values respectively associated with two or more possible classes to a set of real values in the range (0, 1) that sum to one.

The machine-learned model can perform various types of clustering. For example, the machine-learned model can identify one or more previously-defined clusters to which the input data most likely corresponds. As another example, the machine-learned model can identify one or more clusters within the input data. That is, in instances in which the input data includes multiple objects, documents, or other entities, the machine-learned model can sort the multiple entities included in the input data into a number of clusters. In some implementations in which the machine-learned model performs clustering, the machine-learned model can be trained using unsupervised learning techniques.

The machine-learned model can perform anomaly detection or outlier detection. For example, the machine-learned model can identify input data that does not conform to an expected pattern or other characteristics (e.g., as previously observed from previous input data). As examples, anomaly detection can be used for fraud detection or system failure detection.

The machine-learned model can provide output data in the form of one or more recommendations. For example, the machine-learned model can be included in a recommendation system or engine. As an example, given input data that describes previous outcomes for certain entities (e.g., a score, ranking, or rating indicative of an amount of success or enjoyment), the machine-learned model can output a suggestion or recommendation of one or more additional entities that, based on the previous outcomes, are expected to have a desired outcome (e.g., elicit a score, ranking, or rating indicative of success or enjoyment). As one example, given input data descriptive of a number of products purchased or rated highly by a user, a recommendation system can output a suggestion or recommendation of an additional product that the user might enjoy or wish to purchase.

The machine-learned model can act as an agent within an environment. For example, the machine-learned model can be trained using reinforcement learning, which will be discussed in further detail below.

The machine-learned model can be a parametric model, while, in other implementations, the machine-learned model can be a non-parametric model. In some implementations, the machine-learned model can be a linear model, while, in other implementations, the machine-learned model can be a non-linear model.

As described above, the machine-learned model can be or include one or more of various different types of machine-learned models. Examples of such different types of machine-learned models are provided below for illustration. One or more of the example models described below can be used (e.g., combined) to provide the output data in response to the input data. Additional models beyond the example models provided below can be used as well.

The machine-learned model can be or include one or more classifier models such as, for example, linear classification models, quadratic classification models, etc.

The machine-learned model can be or include one or more regression models such as, for example, simple linear regression models, multiple linear regression models, logistic regression models, stepwise regression models, multivariate adaptive regression splines; locally estimated scatterplot smoothing models; etc.

The machine-learned model can be or include one or more decision tree-based models such as, for example, classification and/or regression trees; ID3 (Iterative Dichotomiser 3)

decision trees; C4.5 decision trees; chi-squared automatic interaction detection decision trees; decision stumps; conditional decision trees; etc.

The machine-learned model can be or include one or more kernel machines. In some implementations, the machine-learned model can be or include one or more support vector machines.

The machine-learned model can be or include one or more instance-based learning models such as, for example, learning vector quantization models, self-organizing map models, locally weighted learning models, etc.

The machine-learned model can be or include one or more nearest neighbor models such as, for example, k-nearest neighbor classifications models; k-nearest neighbors regression models; etc.

The machine-learned model can be or include one or more Bayesian models such as, for example, naïve Bayes models, Gaussian naïve Bayes models, multinomial naïve Bayes models; averaged one-dependence estimators; Bayesian networks; Bayesian belief networks; hidden Markov models; etc.

The machine-learned model can be or include one or more artificial neural networks (also referred to simply as neural networks). A neural network can include a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer. The nodes of the neural network can be connected or non-fully connected.

The machine-learned model can be or include one or more feed-forward neural networks. In feed-forward networks, the connections between nodes do not form a cycle. For example, each connection can connect a node from an earlier layer to a node from a later layer.

The machine-learned model can be or include one or more recurrent neural networks. In some instances, at least some of the nodes of a recurrent neural network can form a cycle. Recurrent neural networks can be especially useful for processing input data that is sequential in nature. In particular, in some instances, a recurrent neural network can pass or retain information from a previous portion of the input data sequence to a subsequent portion of the input data sequence through the use of recurrent or directed cyclical node connections.

As one example, sequential input data can include time-series data (e.g., sensor data versus time or imagery captured at different times). For example, a recurrent neural network can analyze sensor data versus time to detect or predict a swipe direction, to perform handwriting recognition, etc. As another example, sequential input data can include words in a sentence (e.g., for natural language processing, speech detection or processing, etc.); notes in a musical composition; sequential actions that were taken by a user (e.g., to detect or predict sequential application usage); sequential object states; etc.

Example recurrent neural networks include long short-term (LSTM) recurrent neural networks; gated recurrent units; bi-direction recurrent neural networks; continuous-time recurrent neural networks; neural history compressors; echo state networks; Elman networks; Jordan networks; recursive neural networks; Hopfield networks; fully recurrent networks; sequence-to-sequence configurations; etc.

The machine-learned model can be or include one or more convolutional neural networks. In some instances, a convolutional neural network can include one or more convolutional layers that perform convolutions over input data using learned filters. Filters can also be referred to as kernels. Convolutional neural networks can be especially useful for vision problems such as when the input data includes imagery such as still images or video. However, convolutional neural networks can also be applied for natural language processing.

The machine-learned model can be or include one or more generative networks such as, for example, generative adversarial networks. Generative networks can be used to generate new data, such as new images or other content.

The machine-learned model can be or include an autoencoder. In some instances, the aim of an autoencoder is to learn a representation (e.g., a lower-dimensional encoding) for a set of data, typically for the purpose of dimensionality reduction. For example, in some instances, an autoencoder can seek to encode the input data and then provide output data that reconstructs the input data from the encoding. Recently, the autoencoder concept has become more widely used for learning generative models of data. In some instances, the autoencoder can include additional losses beyond reconstructing the input data.

The machine-learned model can be or include one or more other forms of artificial neural networks such as, for example, deep Boltzmann machines, deep belief networks, stacked autoencoders, etc. Any of the neural networks described herein can be combined (e.g., stacked) to form more complex networks.

One or more neural networks can be used to provide an embedding based on the input data. For example, the embedding can be a representation of knowledge abstracted from the input data into one or more learned dimensions. In some instances, embeddings can be a useful source for identifying related entities. In some instances, embeddings can be extracted from the output of the network, while in other instances, embeddings can be extracted from any hidden node or layer of the network (e.g., a close to final but not the final layer of the network). Embeddings can be useful for performing auto-suggest next video, product suggestion, entity, or object recognition, etc. In some instances, embeddings are useful inputs for downstream models. For example, embeddings can be useful to generalize input data (e.g., search queries) for a downstream model or processing system.

The machine-learned model can include one or more clustering models such as, for example, k-means clustering models, k-medians clustering models, expectation-maximization models, hierarchical clustering models; etc.

The machine-learned model can perform one or more dimensionality reduction techniques such as, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; auto-encoding; etc.

The machine-learned model can perform or be subjected to one or more reinforcement learning techniques such as Markov decision processes, dynamic programming; Q functions or Q-learning; value function approaches; deep Q-networks; differentiable neural computers; asynchronous advantage actor-critics; deterministic policy gradient; etc.

The machine-learned model can be an autoregressive model. In some instances, an autoregressive model can specify that the output data depends linearly on its own previous values and on a stochastic term. In some instances, an autoregressive model can take the form of a stochastic difference equation. One example autoregressive model is WaveNet, which is a generative model for raw audio.

The machine-learned model can include or form part of a multiple model ensemble. As one example, bootstrap aggregating can be performed, which can also be referred to as "bagging." In bootstrap aggregating, a training dataset is split into a number of subsets (e.g., through random sampling with replacement) and a plurality of models are respectively trained on the number of subsets. At inference time, respective outputs of the plurality of models can be combined (e.g., through averaging, voting, or other techniques) and used as the output of the ensemble.

One example model ensemble is a random forest, which can also be referred to as a random decision forest. Random forests are an ensemble learning method for classification, regression, and other tasks. Random forests are generated by producing a plurality of decision trees at training time. In some instances, at inference time, the class that is the mode of the classes (classification) or the mean prediction (regression) of the individual trees can be used as the output of the forest. Random decision forests can correct for decision trees' tendency to overfit their training set.

Another example ensemble technique is stacking, which can, in some instances, be referred to as stacked generalization. Stacking includes training a combiner model to blend or otherwise combine the predictions of several other machine-learned models. Thus, a plurality of machine-learned models (e.g., of the same or of a different type) can be trained based on training data. In addition, a combiner model can be trained to take the predictions from the other machine-learned models as inputs and, in response, produce a final inference or prediction. In some instances, a single-layer logistic regression model can be used as the combiner model.

Another example ensemble technique is boosting. Boosting can include incrementally building an ensemble by iteratively training weak models and then adding to a final strong model. For example, in some instances, each new model can be trained to emphasize the training examples that previous models misinterpreted (e.g., misclassified). For example, a weight associated with each of such misinterpreted examples can be increased. One common implementation of boosting is AdaBoost, which can also be referred to as Adaptive Boosting. Other example boosting techniques include Linear Programming Boosting (LPBoost); TotalBoost; BrownBoost; XGBoost; MadaBoost, LogitBoost, gradient boosting; etc.

Furthermore, any of the models described above (e.g., regression models and artificial neural networks) can be combined to form an ensemble. As an example, an ensemble can include a top-level machine-learned model or a heuristic function to combine and/or weight the outputs of the models that form the ensemble.

Multiple machine-learned models (e.g., that form an ensemble) can be linked and trained jointly (e.g., through backpropagation of errors sequentially through the model ensemble). However, in some implementations, only a subset (e.g., one) of the jointly trained models is used for inference.

The machine-learned model can be used to preprocess the input data for subsequent input into another model. For example, the machine-learned model can perform dimensionality reduction techniques and embeddings (e.g., matrix factorization, principal components analysis, singular value decomposition, Word2vec/GloVe, and/or related approaches); clustering; and even classification and regression for downstream consumption. Many of these techniques have been discussed above and will be further discussed below.

Referring again to FIG. 8, and as discussed above, the machine-learned model can be trained or otherwise configured to receive the input data and, in response, provide the output data. The input data can include different types, forms, or variations of input data. As examples, in various implementations, the input data can include determined image features and/or image features provided by a user.

The machine-learned model can receive and use the input data in its raw form. In some implementations, the raw input data can be preprocessed. Thus, in addition, or alternatively to the raw input data, the machine-learned model can receive and use the preprocessed input data.

Preprocessing the input data can include extracting one or more additional features from the raw input data. For example, feature extraction techniques can be applied to the input data to generate one or more new, additional features. Example feature extraction techniques include edge detection; corner detection; blob detection; ridge detection; scale-invariant feature transform; motion detection; optical flow; Hough transform; etc.

The extracted features can include or be derived from transformations of the input data into other domains and/or dimensions. As an example, the extracted features can include or be derived from the transformation of the input data into the frequency domain. For example, wavelet transformations and/or fast Fourier transforms can be performed on the input data to generate additional features.

The extracted features can include statistics calculated from the input data or certain portions or dimensions of the input data. Example statistics include the mode, mean, maximum, minimum, or other metrics of the input data or portions thereof As described above, the input data can be sequential in nature. In some instances, the sequential input data can be generated by sampling or otherwise segmenting a stream of input data. As one example, frames can be extracted from a video. In some implementations, sequential data can be made non-sequential through summarization.

As another example preprocessing technique, portions of the input data can be imputed. For example, additional synthetic input data can be generated through interpolation and/or extrapolation.

As another example preprocessing technique, some or all of the input data can be scaled, standardized, normalized, generalized, and/or regularized. Example regularization techniques include ridge regression; least absolute shrinkage and selection operator (LASSO); elastic net; least-angle regression; cross-validation; L1 regularization; L2 regularization; etc. As one example, some or all of the input data can be normalized by subtracting the mean across a given dimension's feature values from each individual feature value and then dividing by the standard deviation or another metric.

As another example preprocessing technique, some or all of the input data can be quantized or discretized. As yet another example, qualitative features or variables included in the input data can be converted to quantitative features or variables. For example, one hot encoding can be performed.

Dimensionality reduction techniques can be applied to the input data prior to input into the machine-learned model. Several examples of dimensionality reduction techniques are provided above, including, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

During training, the input data can be intentionally deformed in any number of ways to increase model robustness, generalization, or other qualities. Example techniques to deform the input data include adding noise; changing color, shade, or hue; magnification; segmentation; amplification; etc.

Referring again to FIG. 8, in response to receipt of the input data, the machine-learned model 800 can provide the output data. The output data can include different types, forms, or variations of output data. As examples, in various implementations, the output data can include values that represent features of an image (e.g., an input image, an output image, a received image), values that represent image features embedded in the received image, and/or a prediction (e.g., an estimate) of the authenticity of the an image.

As discussed above, the output data can include various types of classification data (e.g., binary classification, multiclass classification, single label, multi-label, discrete classification, regressive classification, probabilistic classification, etc.) or can include various types of regressive data (e.g., linear regression, polynomial regression, nonlinear regression, simple regression, multiple regression, etc.). In other instances, the output data can include clustering data, anomaly detection data, recommendation data, or any of the other forms of output data discussed above.

The output data can influence downstream processes or decision making. As one example, in some implementations, the output data can be interpreted and/or acted upon by a rules-based regulator.

In aspects, when a machine-learned model is stored on a computing system (e.g., user computing system 302), software encryption rules (e.g., a secure hashing algorithm) can be utilized to protect the integrity of the model and prevent a third-party from tampering with a model (e.g., replacing part of a machine-learned model with another model). In aspects, an alert signal may be generated responsive to the detection of attempted tampering.

Thus, the present disclosure provides systems and methods that include or otherwise leverage one or more machine-learned models to generate a prediction (e.g., an estimate) of the authenticity of an image based on determined features and/or recovered image features embedded in the image. Any of the different types or forms of input data described above can be combined with any of the different types or forms of machine-learned models described above to provide any of the different types or forms of output data described above.

The machine-learned model 800 can be stored at and/or implemented locally by a computing system (e.g., computing system 300 of FIG. 3). For example, the machine-learned model 800 can be stored at and/or implemented locally by a user computing device or an embedded computing device. Output data obtained through local implementation of the machine-learned model at the computing system can be used to improve the performance of the computing system (e.g., an application implemented by the computing system). As one example, FIG. 3 illustrates a block diagram of a user computing system 302 (e.g., a mobile computing device) that stores and implements a machine-learned model 320 locally.

The machine-learned model can be stored at and/or implemented by a server computing device (such as server computing system 330 of FIG. 3). In some instances, output data obtained through the implementation of the machine-learned model at the server computing device can be used to improve other server tasks or can be used by other non-user devices to improve services performed by or for such other non-user devices. For example, the output data can improve other downstream processes performed by the server computing device for a user computing device or embedded computing device. In other instances, output data obtained through the implementation of the machine-learned model at the server computing device can be sent to and used by a user computing device, an embedded computing device, or some other client device. For example, the server computing device can be said to perform machine learning as a service. As one example, FIG. 3 illustrates a block diagram of an example user computing system 302 that can communicate over a network 380 with an example server computing system 330 that includes a machine-learned model 340.

Different respective portions of the machine-learned model can be stored at and/or implemented by some combination of a user computing device, an embedded computing device, a server computing device, etc.

Computing devices can perform graph processing techniques or other machine learning techniques using one or more machine learning platforms, frameworks, and/or libraries, such as, for example, TensorFlow, Caffe/Caffe2, Theano, Torch/PyTorch, MXNet, Cognitive Toolkit (CNTK), etc.

Computing devices can be distributed at different physical locations and connected via one or more networks. Distributed computing devices can operate according to sequential computing architectures, parallel computing architectures, or combinations thereof. In one example, distributed computing devices can be controlled or guided through the use of a parameter server.

Multiple instances of the machine-learned model can be parallelized to provide increased processing throughput. For example, the multiple instances of the machine-learned model can be parallelized on a single processing device or computing device or parallelized across multiple processing devices or computing devices.

The machine-learned models described herein can be trained at a training computing system and then provided for storage and/or implementation at one or more computing devices, as described above. For example, a model trainer 360 can be located at the training computing system 350, as illustrated in FIG. 3. The training computing system 350 can be included in or separate from the one or more computing devices that implement the machine-learned model. As one example, FIG. 3 illustrates a block diagram of an example user computing system 302 in communication with an example training computing system 350 that includes a model trainer 360.

The machine-learned model can be trained in an offline fashion or an online fashion. In offline training (also known as batch learning), a model is trained on the entirety of a static set of training data. In online learning, the model is continuously trained (or re-trained) as new training data becomes available (e.g., while the model is used to perform inference).

The model trainer can perform centralized training of the machine-learned models (e.g., based on a centrally stored dataset). In other implementations, decentralized training techniques such as distributed training, federated learning, or the like can be used to train, update, or personalize the machine-learned models.

The machine-learned models described herein can be trained according to one or more of various different training types or techniques. For example, in some implementations, the machine-learned models can be trained using supervised learning, in which the machine-learned model is trained on a training dataset that includes instances or examples that have labels. The labels can be manually applied by experts, generated through crowd-sourcing, or provided by other techniques (e.g., by physics-based or complex mathematical models). In some implementations, if the user has provided consent, the training examples can be provided by the user computing device. In some implementations, this process can be referred to as personalizing the model.

The machine-learned model can be trained by optimizing an objective function. For example, in some implementations, the objective function can be or include a loss function that compares (e.g., determines a difference between) output data generated by the model from the training data and labels (e.g., ground-truth labels) associated with the training data. For example, the loss function can evaluate a sum or mean of squared differences between the output data and the labels. As another example, the objective function can be or include a cost function that describes the cost of a certain outcome or output data. Other objective functions can include margin-based techniques such as, for example, triplet loss or maximum-margin training.

One or more of various optimization techniques can be performed to optimize the objective function. For example, the optimization technique(s) can minimize or maximize the objective function. Example optimization techniques include Hessian-based techniques and gradient-based techniques, such as, for example, coordinate descent, gradient descent (e.g., stochastic gradient descent), subgradient methods, etc. Other optimization techniques include blackbox optimization techniques and heuristics.

Backward propagation of errors can be used in conjunction with an optimization technique (e.g., gradient-based techniques) to train a model (e.g., a multi-layer model such as an artificial neural network). For example, an iterative cycle of propagation and model parameter (e.g., weights) update can be performed to train the model. Example backpropagation techniques include truncated backpropagation through time, Levenberg-Marquardt backpropagation, etc.

The machine-learned models described herein can be trained using unsupervised learning techniques. Unsupervised learning can include inferring a function to describe a hidden structure from unlabeled data. For example, classification or categorization may not be included in the data. Unsupervised learning techniques can be used to produce machine-learned models capable of performing clustering, anomaly detection, learning latent variable models, or other tasks.

The machine-learned models described herein can be trained using semi-supervised techniques that combine aspects of supervised learning and unsupervised learning.

The machine-learned models described herein can be trained or otherwise generated through evolutionary techniques or genetic algorithms.

The machine-learned models described herein can be trained using reinforcement learning. In reinforcement learning, an agent (e.g., model) can take actions in an environment and learn to maximize rewards and/or minimize penalties that result from such actions. Reinforcement learning can differ from the supervised learning problem in that correct input/output pairs are not presented, nor suboptimal actions explicitly corrected.

One or more generalization techniques can be performed during training to improve the generalization of the machine-learned model. Generalization techniques can help reduce the overfitting of the machine-learned model to the training data. Example generalization techniques include dropout techniques, weight decay techniques, batch normalization, early stopping, subset selection, stepwise selection, etc.

The machine-learned models described herein can include or otherwise be impacted by a number of hyperparameters, such as, for example, learning rate, number of layers, number of nodes in each layer, number of leaves in a tree, number of clusters; etc. Hyperparameters can affect model performance. Hyperparameters can be hand-selected or can be automatically selected through the application of techniques such as, for example, grid search; black-box optimization techniques (e.g., Bayesian optimization, random search, etc.); gradient-based optimization; etc. Example techniques and/or tools for performing automatic hyperparameter optimization include Hyperopt; Auto-WEKA; Spearmint; Metric Optimization Engine (MOE); etc.

Various techniques can be used to optimize and/or adapt the learning rate when the model is trained. Example techniques and/or tools for performing learning rate optimization or adaptation include AdaGrad, Adaptive Moment Estimation (ADAM), ADADELTA, RMSprop, etc.

Transfer learning techniques can be used to provide an initial model from which to begin training of the machine-learned models described herein.

The machine-learned models described herein can be included in different portions of computer-readable code on a computing device. In one example, the machine-learned model can be included in a particular application or program and used (e.g., exclusively) by such a particular application or program. Thus, in one example, a computing device can include a number of applications, and one or more of such applications can contain its own respective machine learning library and machine-learned model(s).

The machine-learned models described herein can be included in an operating system of a computing device (e.g., in a central intelligence layer of an operating system) and can be called or otherwise used by one or more applications that interact with the operating system. In some implementations, each application can communicate with the central intelligence layer (and model(s) stored therein) using an application programming interface (API) (e.g., a common, public API across all applications).

The central intelligence layer can communicate with a central device data layer. The central device data layer can be a centralized repository of data for the computing device. The central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein refers to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

In addition, the machine learning techniques described herein are readily interchangeable and combinable. Although certain example techniques have been described, many others exist and can be used in conjunction with aspects of the present disclosure.

Thus, while the present subject matter has been described in detail with respect to various specific example implementations, each example is provided by way of explanation, not a limitation of the disclosure. One of ordinary skill in the art can readily make alterations to, variations of, and equivalents to such implementations. Accordingly, the subject disclosure does not preclude inclusion of such modifications, variations and/or additions to the present subject matter as would be readily apparent to one of ordinary skill in the art. For instance, features illustrated or described as part of one implementation can be used with another implementation to yield a still further implementation.

EXAMPLES

In the following section, some examples are described:

Example 1: A method comprising: receiving, by a decoder system (220), an image (210) to be verified; performing feature recognition on the received image (210) to determine a plurality of determined features (238) of the received image (210); generating a first output (236) defining values representing the determined features (238) of the received image (210); decoding the received image (210), by a message decoding neural network (252) of the decoder system (220), to extract a signature (254) embedded in the received image (210), the signature (254) representing recovered features (258) of the received image (210); generating a second output (256) defining values representing the recovered features (258) of the received image (210); providing the first output (236) and the second output (256) to a manipulation detection neural network (272) of the decoder system (220); and generating, by the manipulation detection neural network (272), an estimation of an authenticity of the received image (210) utilizing at least the first output (236) and the second output (256).

Example 2: The method of example 1, wherein performing feature recognition on the received image further comprises at least one of: processing the received image using a first feature extraction neural network to select the plurality of features of the received image; or receiving first user input to select the plurality of features of the received image.

Example 3: The method of example 1 or example 2, further comprising: receiving, by an encoder system, an input image; performing feature recognition on the input image to determine a plurality of determined features of the input image; and generating a third output defining values representing the determined features of the input image.

Example 4: The method of example 3, wherein performing feature recognition on the received image comprises processing the received image using a first feature extraction neural network to select the plurality of features of the received image; wherein performing feature recognition on the input image comprises processing the input image using a second feature extraction neural network to select the plurality of features of the input image; the method further comprising: providing the second output and the third output to a discrimination feature loss computation engine; computing, by the discrimination feature loss computation engine, based at least on the second output and the third output, a first loss based on a first loss function; computing, based at least on the input image and the received image, a second loss based on a second loss function; computing, based at least on the first loss and the second loss, a total loss based on a total loss function; and co-training at least one of the first feature extraction neural network or the second feature extraction neural network with the message decoding neural network based at least on the computed total loss.

Example 5: The method of example 3 or example 4, further comprising: providing the third output to a message encoding neural network; generating a second signature from the third output; and embedding the second signature in the input image to generate an output image.

Example 6: The method of example 3, wherein performing feature recognition on the input image further comprises at least one of: processing the input image using a second feature extraction neural network to select the plurality of features of the input image; or receiving second user input to select the plurality of features of the input image.

Example 7: The method of any of examples 4-6, further comprising: performing a feature extraction neural network training procedure comprising: computing, based at least on the second output and the third output, a third loss based on a third loss function; and training at least one of the first feature extraction neural network or the second feature extraction neural network based at least on the computed third loss.

Example 8: The method of any of examples 3-7, wherein receiving the input image comprises at least one of: receiving the input image from an image repository; or receiving the input image responsive to user selection; and wherein receiving the received image to be verified comprises at least one of: receiving the received image from an image repository; or receiving the received image responsive to user selection.

Example 9: The method of any of example 3, example 5, or example 8, wherein performing feature recognition on the received image comprises processing the received image using a first feature extraction neural network to select the plurality of features of the received image; wherein performing feature recognition on the input image comprises processing the input image using a second feature extraction neural network to select the plurality of features of the input image; the method further comprising: fixing the values of at least one of the first feature extraction neural network, the second feature extraction neural network, a message encoding neural network, or the message decoding neural network; generating a training image including at least one image manipulation; sending the training image to the manipulation detection neural network; determining the image manipulation applied to the training image; computing, utilizing the image manipulation applied to the training image, a normal loss based on a normal loss function; and training the manipulation detection neural network based at least on the computed normal loss.

Example 10: The method of any of example 3, example 5, or example 8, wherein performing feature recognition on the received image comprises processing the received image using a first feature extraction neural network to select the plurality of features of the received image; wherein performing feature recognition on the input image comprises processing the input image using a second feature extraction neural network to select the plurality of features of the input image; the method further comprising: computing, based on the input image, an image loss based on an image loss function; computing, based on the input image, a feature loss based on a feature loss function; computing a total loss based on the image loss and the feature loss; and training at least one of the message encoding neural network or the message decoding neural network based at least on the computed total loss.

Example 11: The method of any of examples 3-8, or 10, further comprising: applying at least one image manipulation to the input image.

Example 12: The method of example 10, further comprising: fixing the values of at least one of the first feature extraction neural network, the second feature extraction neural network, the message encoding neural network, or the message decoding neural network; generating a training image including at least one image manipulation; sending the training image to the manipulation detection neural network; determining the image manipulation applied to the training image; computing, utilizing the image manipulation applied to the training image, a normal loss based on a normal loss function; and training the manipulation detection neural network based at least on the computed normal loss.

Example 13: The method of example 5 or example 8, further comprising: performing a feature extraction neural network training procedure comprising: computing, based at least on the second output and the third output, a third loss based on a third loss function; training at least one of the first feature extraction neural network or the second feature extraction neural network based at least on the computed third loss; and performing a manipulation detection neural network training procedure comprising: fixing the values of at least one of the first feature extraction neural network, the second feature extraction neural network, the message encoding neural network, or the message decoding neural network; generating a training image including at least one image manipulation; sending the training image to the manipulation detection neural network; determining the image manipulation applied to the training image; computing, utilizing the image manipulation applied to the training image, a normal loss based on a normal loss function; training the manipulation detection neural network based at least on the computed normal loss; and co-training the feature extraction neural network and the manipulation detection neural network.

Example 14: The method of example 3 or example 8, wherein performing the feature recognition on the received image comprises processing the received image using a first feature extraction neural network; wherein performing the feature recognition on the input image comprises processing the input image using a second feature extraction neural network; the method further comprising: providing the third output to a message encoding neural network; generating a second signature from the third output; embedding the second signature in the input image to generate an output image; providing the second output and the third output to a discrimination feature loss computation engine; performing a message coding neural network training procedure comprising: computing, by the discrimination feature loss computation engine, based at least on the second output and the third output, a first loss based on a first loss function; computing, based at least on the input image and the received image, a second loss based on a second loss function; computing, based at least on the first loss and the second loss, a total loss based on a total loss function; training at least one of the first feature extraction neural network, the second feature extraction neural network, or the message decoding neural network based at least on the computed total loss; performing a manipulation detection neural network training procedure comprising: fixing the values of at least one of the first feature extraction neural network, the second feature extraction neural network, the message encoding neural network, or the message decoding neural network; generating a training image including at least one image manipulation; sending the training image to the manipulation detection neural network; computing, the image manipulation applied to the training image, a normal loss based on a normal loss function, wherein the normal loss is cross-entropy loss; and training the manipulation detection neural network based at least on the computed normal loss; and co-training the message coding neural network and the manipulation detection neural network.

Example 15: The method of example 3 or example 8, wherein performing the feature recognition on the received image comprises processing the received image using a first feature extraction neural network; wherein performing the feature recognition on the input image comprises processing the input image using a second feature extraction neural network; the method further comprising: providing the third output to a message encoding neural network; generating a second signature from the third output; embedding the second signature in the input image to generate an output image; providing the second output and the third output to a discrimination feature loss computation engine; performing a message coding neural network training procedure comprising: computing, by the discrimination feature loss computation engine, based at least on the second output and the third output, a first loss based on a first loss function; computing, based at least on the input image and the received image, a second loss based on a second loss function; computing, based at least on the first loss and the second loss, a total loss based on a total loss function; and training at least one of the first feature extraction neural network, the second feature extraction neural network, or the message decoding neural network based at least on the computed total loss; performing a feature extraction neural network training procedure comprises: computing, based at least on the second output and the third output, a third loss based on a third loss function; training at least one of the first feature extraction neural network or the second feature extraction neural network based at least on the computed third loss; and performing a manipulation detection neural network training procedure comprising: fixing the values of at least one of the first feature extraction neural network, the second feature extraction neural network, the message encoding neural network, or the message decoding neural network; generating a training image including at least one image manipulation; sending the training image to the manipulation detection neural network; determining the image manipulation applied to the training image; computing, utilizing the image manipulation applied to the training image, a normal loss based on a normal loss function; and training the manipulation detection neural network based at least on the computed normal loss; and co-training the feature extraction neural network, the message coding neural network, and the manipulation detection neural network.

Example 16: The method of any of examples 4-15, wherein the first feature extraction neural network and the second feature extraction neural network are the same feature extraction neural network.

Example 17: The method of any of examples 9, 12, or 13-15, wherein the normal loss is cross-entropy loss.

Example 18: A computing device comprising: a processor; and a computer-readable storage medium having stored thereon instructions that, responsive to execution by the processor, cause the processor to execute the method of any of examples 1 to 17.

Example 19: A system comprising one or more computers and one or more storage devices storing instructions that when executed by the one or more computers, cause the one or more computers to perform operations comprising the method of any of examples 1 to 17.

Example 20: One or more non-transitory computer storage media storing instructions that when executed by one or more computers, cause the one or more computers to perform operations comprising the method of any of examples 1 to 19.

CONCLUSION

Although techniques and apparatuses for verifying the authenticity of images have been described in language specific to features and/or methods, it is to be understood that the subject of the appended claims is not necessarily limited to the specific features or methods described. Rather, the specific features and methods are disclosed as example implementations of techniques and apparatuses for verifying the authenticity of images.

What is claimed is:

1. A method comprising:
receiving, by a decoder system, an image to be verified;
performing, using a feature extraction neural network, feature recognition on the received image to determine a plurality of determined features of the received image;
generating a first output defining values representing the determined features of the received image;
decoding the received image, by a message decoding neural network of the decoder system, to extract a signature embedded in the received image, the signature representing recovered features of the received image;
generating a second output defining values representing the recovered features of the received image;
providing the first output and the second output to a manipulation detection neural network of the decoder system;
generating, by the manipulation detection neural network, an estimation of an authenticity of the received image utilizing at least the first output and the second output;
receiving, by an encoder system, an input image;
performing feature recognition on the input image to determine a plurality of determined features of the input image;
generating a third output defining values representing the determined features of the input image; and
co-training the feature extraction neural network and the manipulation detection neural network, wherein the feature extraction neural network is trained based on a computed third loss that is computed based on the second output and the third output, and wherein the manipulation detection neural network is trained based on a normal loss that is computed based on an image manipulation determined based on processing a training image with the manipulation detection neural network.

2. The method of claim 1, wherein performing feature recognition on the received image further comprises at least one of:
processing the received image using a first feature extraction neural network to select the plurality of features of the received image; or receiving first user input to select the plurality of features of the received image.

3. The method of claim 1,
wherein performing feature recognition on the received image comprises processing the received image using a first feature extraction neural network to select the plurality of features of the received image;
wherein performing feature recognition on the input image comprises processing the input image using a second feature extraction neural network to select the plurality of features of the input image;
the method further comprising:
providing the second output and the third output to a discrimination feature loss computation engine;
computing, by the discrimination feature loss computation engine, based at least on the second output and the third output, a first loss based on a first loss function;
computing, based at least on the input image and the received image, a second loss based on a second loss function;
computing, based at least on the first loss and the second loss, a total loss based on a total loss function; and
co-training at least one of the first feature extraction neural network or the second feature extraction neural network with the message decoding neural network based at least on the computed total loss.

4. The method of claim 1, further comprising:
providing the third output to a message encoding neural network;
generating a second signature from the third output; and
embedding the second signature in the input image to generate an output image.

5. The method of claim 1, wherein performing feature recognition on the input image further comprises at least one of:
processing the input image using a second feature extraction neural network to select the plurality of features of the input image; or receiving second user input to select the plurality of features of the input image.

6. The method of claim 3, further comprising:
performing a feature extraction neural network training procedure comprising:
computing, based at least on the second output and the third output, a third loss based on a third loss function; and
training at least one of the first feature extraction neural network or the second feature extraction neural network based at least on the computed third loss.

7. The method of claim 1,
wherein receiving the input image comprises at least one of:
receiving the input image from an image repository; or
receiving the input image responsive to user selection; and
wherein receiving the received image to be verified comprises at least one of:
receiving the received image from an image repository; or
receiving the received image responsive to user selection.

8. The method of any of claim 1,
wherein performing feature recognition on the received image comprises processing the received image using a first feature extraction neural network to select the plurality of features of the received image;

wherein performing feature recognition on the input image comprises processing the input image using a second feature extraction neural network to select the plurality of features of the input image;
the method further comprising:
fixing the values of at least one of the first feature extraction neural network, the second feature extraction neural network, a message encoding neural network, or the message decoding neural network;
generating a training image including at least one image manipulation;
sending the training image to the manipulation detection neural network;
determining the image manipulation applied to the training image;
computing, utilizing the image manipulation applied to the training image, a normal loss based on a normal loss function; and
training the manipulation detection neural network based at least on the computed normal loss.

9. The method of any of claim 1,
wherein performing feature recognition on the received image comprises processing the received image using a first feature extraction neural network to select the plurality of features of the received image;
wherein performing feature recognition on the input image comprises processing the input image using a second feature extraction neural network to select the plurality of features of the input image;
the method further comprising:
computing, based on the input image, an image loss based on an image loss function;
computing, based on the input image, a feature loss based on a feature loss function;
computing a total loss based on the image loss and the feature loss; and
training at least one of the message encoding neural network or the message decoding neural network based at least on the computed total loss.

10. The method of claim 1, further comprising:
applying at least one image manipulation to the input image.

11. The method of claim 9, further comprising:
fixing the values of at least one of the first feature extraction neural network, the second feature extraction neural network, the message encoding neural network, or the message decoding neural network;
generating a training image including at least one image manipulation;
sending the training image to the manipulation detection neural network; and
determining the image manipulation applied to the training image.

12. The method of claim 1,
wherein performing the feature recognition on the received image comprises processing the received image using a first feature extraction neural network;
wherein performing the feature recognition on the input image comprises processing the input image using a second feature extraction neural network;
the method further comprising:
providing the third output to a message encoding neural network;
generating a second signature from the third output;
embedding the second signature in the input image to generate an output image;
providing the second output and the third output to a discrimination feature loss computation engine;
performing a message coding neural network training procedure;
performing a manipulation detection neural network training procedure comprising:
fixing the values of at least one of the first feature extraction neural network, the second feature extraction neural network, the message encoding neural network, or the message decoding neural network;
generating a training image including at least one image manipulation;
sending the training image to the manipulation detection neural network;
computing, the image manipulation applied to the training image, a normal loss based on a normal loss function; and
training the manipulation detection neural network based at least on the computed normal loss; and
co-training the message coding neural network and the manipulation detection neural network.

13. The method of claim 1,
wherein performing the feature recognition on the received image comprises processing the received image using a first feature extraction neural network;
wherein performing the feature recognition on the input image comprises processing the input image using a second feature extraction neural network;
the method further comprising:
providing the third output to a message encoding neural network;
generating a second signature from the third output;
embedding the second signature in the input image to generate an output image;
providing the second output and the third output to a discrimination feature loss computation engine;
performing a message coding neural network training procedure comprising:
computing, by the discrimination feature loss computation engine, based at least on the second output and the third output, a first loss based on a first loss function;
computing, based at least on the input image and the received image, a second loss based on a second loss function;
computing, based at least on the first loss and the second loss, a total loss based on a total loss function; and
training at least one of the first feature extraction neural network, the second feature extraction neural network, or the message decoding neural network based at least on the computed total loss;
performing a feature extraction neural network training procedure comprises:
computing, based at least on the second output and the third output, a third loss based on a third loss function;
training at least one of the first feature extraction neural network or the second feature extraction neural network based at least on the computed third loss; and
performing a manipulation detection neural network training procedure comprising:
fixing the values of at least one of the first feature extraction neural network, the second feature extraction neural network, the message encoding neural network, or the message decoding neural network;
generating a training image including at least one image manipulation;
sending the training image to the manipulation detection neural network;
determining the image manipulation applied to the training image;
computing, utilizing the image manipulation applied to the training image, a normal loss based on a normal loss function; and
training the manipulation detection neural network based at least on the computed normal loss; and
co-training the feature extraction neural network, the message coding neural network, and the manipulation detection neural network.

14. The method of claim 11, further comprising:
computing, utilizing the image manipulation applied to the training image, a normal loss based on a normal loss function; and
training the manipulation detection neural network based at least on the computed normal loss.

15. The method of claim 4, wherein the manipulation detection neural network training procedure comprises:
fixing the values of at least one of the first-feature extraction neural network, the message encoding neural network, or the message decoding neural network;
generating a training image including at least one image manipulation;
sending the training image to the manipulation detection neural network;
determining the image manipulation applied to the training image;
computing, utilizing the image manipulation applied to the training image, a normal loss based on a normal loss function; and
training the manipulation detection neural network based at least on the computed normal loss.

16. The method of claim 12, wherein the message coding neural network training procedure comprises:
computing, by the discrimination feature loss computation engine, based at least on the second output and the third output, a first loss based on a first loss function;
computing, based at least on the input image and the received image, a second loss based on a second loss function;
computing, based at least on the first loss and the second loss, a total loss based on a total loss function; and
training at least one of the first feature extraction neural network, the second feature extraction neural network, or the message decoding neural network based at least on the computed total loss.

17. A computing system comprising:
one or more processors; and
one or more non-transitory computer-readable media that collectively store instructions that, when executed by the one or more processors, cause the computing system to perform operations, the operations comprising:
receiving, by a decoder system, an image to be verified;
performing, using a first feature extraction neural network, feature recognition on the received image to determine a plurality of determined features of the received image;
generating a first output defining values representing the determined features of the received image;
decoding the received image, by a message decoding neural network of the decoder system, to extract a signature embedded in the received image, the signature representing recovered features of the received image;
generating a second output defining values representing the recovered features of the received image;
providing the first output and the second output to a manipulation detection neural network of the decoder system;
generating, by the manipulation detection neural network, an estimation of an authenticity of the received image utilizing at least the first output and the second output;
receiving, by an encoder system, an input image;
performing, using a second feature extraction neural network, feature recognition on the input image to determine a plurality of determined features of the input image;
generating a third output defining values representing the determined features of the input image;
computing, based on the input image, an image loss based on an image loss function and a feature loss based on a feature loss function;
computing a total loss based on the image loss and the feature loss; and
training at least one of the message encoding neural network or the message decoding neural network based at least on the computed total loss.

18. One or more non-transitory computer-readable media that collectively store instructions that, when executed by one or more computing devices, cause the one or more computing devices to perform operations, the operations comprising:
obtaining, by a decoder system, an image to be verified;
performing, using a first feature extraction neural network, feature recognition on the image to determine a plurality of determined features of the image;
generating a first output, wherein the first output comprises one or more values representing the determined features of the image;
decoding the image, by a message decoding neural network of the decoder system, to determine a signature embedded in the image, wherein the signature is descriptive of recovered features of the image;
generating a second output, wherein the second output comprises one or more values representing the recovered features of the image;
providing the first output and the second output to a manipulation detection neural network of the decoder system;
generating, by the manipulation detection neural network, a predicted authenticity of the image based on at least one of the first output and the second output, wherein the manipulation detection neural network was trained by:
fixing the values of at least one of the first feature extraction neural network, a message encoding neural network, or the message decoding neural network;
generating a training image including at least one image manipulation;
processing the training image with the manipulation detection neural network to determine the image manipulation applied to the training image;
computing, utilizing the image manipulation applied to the training image, a normal loss based on a normal loss function; and training the manipulation detection neural network based at least on the computed normal loss.

* * * * *